(12) United States Patent
Johnson

(10) Patent No.: US 12,233,954 B2
(45) Date of Patent: Feb. 25, 2025

(54) QUICK RELEASE FOR MODULAR TRANSPORT UNITS

(71) Applicant: KIMTEK CORPORATION, Orleans, VT (US)

(72) Inventor: Kimball W. Johnson, Orleans, VT (US)

(73) Assignee: Kimtek Corporation, Orleans, VT (US)

( * ) Notice: Subject to any disclaimer, the term of this patent is extended or adjusted under 35 U.S.C. 154(b) by 0 days.

(21) Appl. No.: 18/412,883

(22) Filed: Jan. 15, 2024

(65) Prior Publication Data

US 2024/0149953 A1 May 9, 2024

Related U.S. Application Data

(63) Continuation of application No. 17/301,052, filed on Mar. 23, 2021, now Pat. No. 11,904,950.

(Continued)

(51) Int. Cl.
*B60R 9/06* (2006.01)
*B60N 2/015* (2006.01)
(Continued)

(52) U.S. Cl.
CPC ....... *B62D 33/0207* (2013.01); *B60N 2/0155* (2013.01); *B60N 2/3097* (2013.01); *B60P 3/04* (2013.01); *B60R 9/065* (2013.01)

(58) Field of Classification Search
CPC .............. B62D 33/0207; B60N 2/0155; B60N 2/3097; B60R 9/065; B60P 7/08
(Continued)

(56) References Cited

U.S. PATENT DOCUMENTS 1,862,632 A * 6/1932 Perin ........................ B60P 7/13
410/80
2,503,368 A * 4/1950 Willetts ................ B61D 45/00
410/77
(Continued)

FOREIGN PATENT DOCUMENTS

AU 2012101236 A4 * 10/2012
BR 202013032478 U2 * 1/2018
(Continued)

OTHER PUBLICATIONS

Wikipedia entry for skid unit (Year: 2008); https://en.wikipedia.org/wiki/Skid_unit.*
(Continued)

*Primary Examiner* — Hilary L Gutman
(74) *Attorney, Agent, or Firm* — Downs Rachlin Martin PLLC

(57) ABSTRACT

Modular skid units that are versatile and easily configurable for particular applications. In some examples, a modular design allows for many different combinations of modular components, such as seats, canine boxes, storage boxes, patient transport units, etc. In some examples, the modular and quick release nature of the system enables users to selectively remove and attach the modular components as needed for a given task, including the ability to quickly and easily change the modular components in the field to meet the specific needs of a mission or task. In some examples, the modular components include quick release locking mechanisms that include a set of locking elements for quickly and easily switching components.

12 Claims, 17 Drawing Sheets

Related U.S. Application Data

(60) Provisional application No. 63/007,621, filed on Apr. 9, 2020.

(51) Int. Cl.
*B60N 2/30* (2006.01)
*B60P 3/04* (2006.01)
*B62D 33/02* (2006.01)

(58) Field of Classification Search
USPC ........................................................ 296/37.6
See application file for complete search history.

(56) References Cited

U.S. PATENT DOCUMENTS

| | | | |
|---|---|---|---|
| 3,984,117 A * | 10/1976 | Bates | B60P 7/08 410/77 |
| 4,037,871 A * | 7/1977 | Bourgraf | A61G 1/0293 5/110 |
| 4,257,647 A * | 3/1981 | Gianessi | B60N 2/43 248/397 |
| 4,729,573 A * | 3/1988 | Davis | A61G 3/0808 410/7 |
| 5,018,778 A | 5/1991 | Goble | |
| 5,046,913 A * | 9/1991 | Domek | B60R 5/04 24/514 |
| 5,069,465 A * | 12/1991 | Stryker | A61G 1/048 403/102 |
| 5,092,722 A * | 3/1992 | Reazer, III | A61G 1/06 410/104 |
| 5,121,306 A | 6/1992 | Palmisano | |
| 5,154,478 A | 10/1992 | Erickson et al. | |
| 5,205,601 A * | 4/1993 | Ferris | A61G 1/06 410/7 |
| 5,326,067 A * | 7/1994 | Gonzalez | B60N 2/01583 297/440.22 |
| 5,344,265 A * | 9/1994 | Ullman | A61G 3/0808 410/3 |
| 5,490,703 A * | 2/1996 | Hewko | A61G 3/0254 244/118.6 |
| 5,494,386 A * | 2/1996 | Paull | A61G 1/06 410/3 |
| 5,628,595 A * | 5/1997 | Harris | A61G 3/0808 410/7 |
| 5,730,414 A * | 3/1998 | Wenger | B62D 25/2072 224/42.32 |
| 6,109,494 A * | 8/2000 | Pilmore | B60P 3/073 224/403 |
| 6,250,529 B1 | 6/2001 | Babbitt et al. | |
| 6,666,362 B1 | 12/2003 | LeTrudet | |
| 6,742,825 B1 | 6/2004 | Macaulay | |
| 7,165,702 B1 | 1/2007 | Billberg | |
| 7,377,570 B2 | 5/2008 | Rondeau et al. | |
| 7,913,651 B1 | 3/2011 | Schiebout | |
| 8,308,212 B2 * | 11/2012 | Schrand | A61G 1/0565 410/80 |
| 8,444,034 B2 | 5/2013 | Bennett | |
| 9,168,875 B2 | 10/2015 | Haler | |
| 9,643,675 B2 | 5/2017 | Boutin et al. | |
| 10,011,210 B2 | 7/2018 | Crawford et al. | |
| 10,376,723 B2 | 8/2019 | Schultz | |
| 10,427,616 B2 | 10/2019 | Wilckens et al. | |
| 10,448,141 B2 | 11/2019 | Page et al. | |
| 10,464,498 B2 | 11/2019 | Cox | |
| 10,493,826 B2 | 12/2019 | McWhorter et al. | |
| 10,526,019 B2 | 1/2020 | Jhant et al. | |
| 10,544,895 B2 | 1/2020 | Chinn et al. | |
| 10,618,430 B2 | 4/2020 | Rubanovich | |
| 10,782,007 B2 | 9/2020 | Grider et al. | |
| 10,791,661 B2 | 10/2020 | Dretzka et al. | |
| 10,791,669 B2 | 10/2020 | Dretzka et al. | |
| 10,794,656 B2 | 10/2020 | Page et al. | |
| 10,829,056 B2 | 11/2020 | Pratka et al. | |
| 11,328,619 B1 | 5/2022 | Suntup | |
| 2001/0050299 A1 | 12/2001 | Coleman et al. | |
| 2002/0064433 A1 * | 5/2002 | Constantin | A61G 3/0808 410/7 |
| 2007/0216187 A1 | 9/2007 | Hyde | |
| 2010/0045059 A1 | 2/2010 | Bourgraf et al. | |
| 2011/0220033 A1 | 9/2011 | Sangl et al. | |
| 2015/0121974 A1 | 5/2015 | Schuling et al. | |
| 2022/0411070 A1 | 12/2022 | Pierre et al. | |
| 2023/0127788 A1 | 4/2023 | Gerez et al. | |

FOREIGN PATENT DOCUMENTS

| | | | | |
|---|---|---|---|---|
| CH | 700901 A2 | | 10/2010 | |
| DE | 202009002004 U1 * | | 11/2009 | ............ B62H 5/147 |
| DE | 102018114774 A1 * | | 1/2019 | ............ B60N 2/005 |
| FR | 2775227 A1 * | | 8/1999 | ........ B60N 2/01583 |
| FR | 2830437 A1 * | | 4/2003 | .............. A61G 1/06 |
| JP | H04218443 A | | 8/1992 | |
| JP | H0648250 A * | | 2/1994 | |
| JP | 10181395 A * | | 7/1998 | ........ B60N 2/01583 |

OTHER PUBLICATIONS

Wikipedia entry for skid unit (Year: 2005); https://en.wikipedia.org/wiki/Skid_unit.*
Machine translation FR2775227 (Year: 2003).*
https://www.fireapparatusmagazine.com/fire-apparatus/utv-and-atv-units-being-equipped-for-fire-rescue-and-ems-duties/ (Year: 2019).*
QTAC EMS-R—QTAC Fire and Rescue Apparatus for UTVs and Trucks. https://www.qtacfire.com/ems-rescue-utv-atv-skids/qtac-ems-r (Last viewed on Mar. 9, 2021).
UTV (SxS) Med Rescues—RKO Enterprises. https://rkoenterprises.com/utv-sxs-med-rescues/ (Last viewed on Mar. 9, 2021).
CET, ATV Fire Pump Pack 3—EMS. https://www.fire-pump.com/atv-fire-pack-3-ems (Last viewed on Mar. 9, 2021).
Kimtek Corporation Medlite Transport Basic MTB-101 Product (Last viewed on Dec. 7, 2020) https://www.kimtekresearch.com/medlite_mtb.php#:~:text=The%20MEDLITE%C2%AE%20Transport%20Basic,is%20a%20fixed%20position%20seat.
Kimtek Corporation Medlite Transport Deluxe MTD-103 Product (Last viewed on Dec. 7, 2020) https://www.kimtekresearch.com/medlite_mtd.php.
Kimtek Corporation Medlite Transport Stretcher MTSTR-104 Product (Last viewed on Dec. 7, 2020) https://www.kimtekresearch.com/medlite_mtstr.php.

* cited by examiner

TOP VIEW

FRONT VIEW

RIGHT SIDE VIEW

FRONT VIEW

BOTTOM VIEW

FRONT VIEW

LOCKED POSITION

UNLOCKED POSITION

BASE REMOVED

EXPLODED VIEW

LOCKED POSITION (DETAIL)

UNLOCKED POSITION (DETAIL)

FRONT VIEW

RIGHT SIDE VIEW

QUICK RELEASE FOR MODULAR TRANSPORT UNITS

RELATED APPLICATION DATA

This application is a continuation of U.S. patent application Ser. No. 17/301,052, filed Mar. 23, 2021, and titled "Modular Transport Units and Methods of Using the Same," which application claims the benefit of priority of U.S. Provisional Patent Application Ser. No. 63/007,621, filed Apr. 9, 2020, and titled "Modular Transport Units and Methods of Using the Same," each of which is incorporated by reference herein in its entirety. The present application is also related to U.S. Design patent application Ser. No. 29/652,810, filed Dec. 7, 2020, and titled "Modular Transport Unit," which is incorporated by reference herein in its entirety.

FIELD OF THE INVENTION

The present invention generally relates to the field of transport units. In particular, the present invention is directed to modular transport units and methods of using the same.

BACKGROUND

Skid units are designed to be slid into a rear cargo area of a vehicle to add functionality to the vehicle, such as extra seating, storage, or functional components. Skid units typically include a chassis configured and dimensioned to be disposed in a rear cargo area of a vehicle, the chassis containing one or more functional components. Skid units can be configured for any vehicle with a rear cargo area, such as pickup trucks, flat-bed trucks, vans, sport utility vehicles, golf carts, and off-road vehicles, such as all-terrain vehicles (ATVs) or utility vehicles (UTVs). ATVs and UTVs include vehicles with one passage seat as well as vehicles with multiple passage seats that include a passenger area with at least one pair of laterally disposed side by side passenger seats, typically referred to in the art as side by sides. Skid units can also be configured to be disposed in trailers. The chassis of the skid unit is typically fitted with a variety of functional components according to the intended use of the skid unit. For example, a skid unit designed for firefighting operations may include a water tank, water pump, and hose, and storage. Skid units for medical rescue and injury carts for athletic events may include a seat and a patient transport area, where the seat and patient transport may be in a lateral side by side arrangement.

SUMMARY OF THE DISCLOSURE

In one implementation, the present disclosure is directed to a system. The system includes at least one modular component having a base, the at least one modular component configured to be releasably attached to a cargo bed of a vehicle or a skid unit; and quick release means for releasably attaching the at least one modular component to the cargo bed in a locked and secure fashion.

In another implementation, the present disclosure is directed to a quick release assembly for securing a modular component to a cargo bed of a vehicle or skid unit. The quick release assembly includes a first locking element configured to be disposed on the cargo bed; a second locking element configured to be disposed on a base of the modular component, the first and second locking elements configured to be releasably engaged to couple the modular component to the cargo bed; and a locking mechanism disposed on the cargo bed, the locking mechanism including a catch configured to receive a portion of the second locking element when the first and second locking elements are engaged, the catch movable between an unlocked position for receiving the second locking element and a locked position in which the first and second locking elements are locked by the locking mechanism.

In yet another implementation, the present disclosure is directed to a method of releasably locking a modular component to a cargo bed of a skid unit or vehicle. The method includes aligning a pair of first locking elements with a pair of second locking elements of a quick release assembly; lowering the second locking elements on to the first locking elements so that protruding ends of the second locking elements are slidably disposed in corresponding angled receiving channels of the first locking elements and a portion of one of the second locking elements is also disposed in a catch of a locking mechanism located between the pair of first locking elements; and moving a lever or handle of the locking mechanism from a first position to a second position thereby causing the catch of the locking mechanism to move in a horizontal direction, wherein the movement of the catch pushes the second locking element disposed in the catch in a horizontal direction, causing the protruding ends to move along horizontal portions of the angled receiving channels to a locked position.

BRIEF DESCRIPTION OF THE DRAWINGS

For the purpose of illustrating the disclosure, the drawings show aspects of one or more embodiments of the disclosure. However, it should be understood that the present disclosure is not limited to the precise arrangements and instrumentalities shown in the drawings, wherein.

DETAILED DESCRIPTION

Figure 1A:
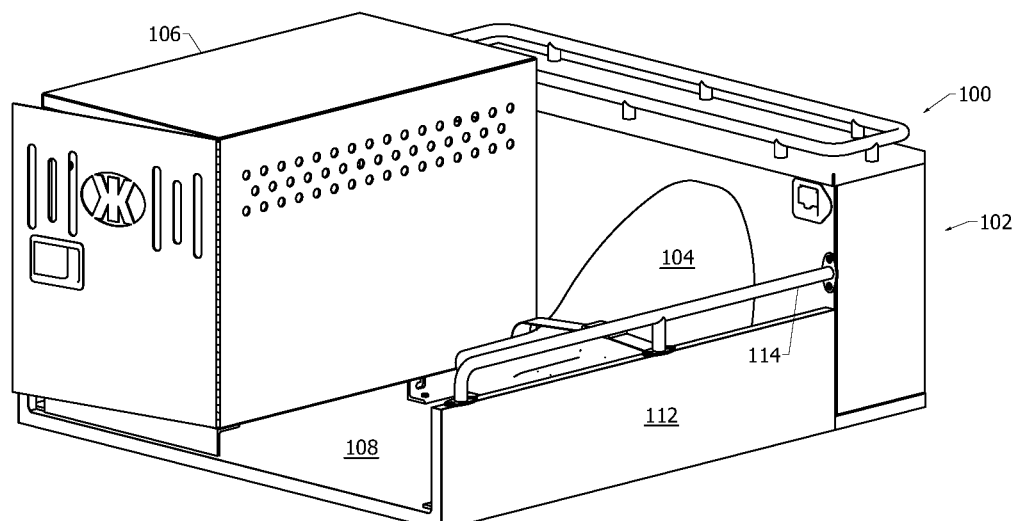
FIG. 1A is a perspective view of one example of a modular skid unit with two releasably attached modular components that include a canine box and passage seat each releasably attached with a corresponding quick release assembly located between a base of the modular component and the cargo bed of the skid unit.

Aspects of the present disclosure include configurable skid units with modular components that are versatile and easily configurable for a particular application. In some examples, configurable skid units of the present disclosure are configured for providing transport of law enforcement officers and their equipment with all-terrain vehicles to remote areas to allow the officers to effect a search and rescue, manhunt of escaped convicts, body recovery, off road investigation, or other law enforcement issues as they arise. In some examples, a modular design allows for different combinations of modular components, such as seats, canine boxes, storage boxes, patient transport, etc. to be installed in the skid unit. In some examples, the skid units include quick release mechanisms for selectively installing and removing modular components as needed for a given task, including the ability to quickly and easily change the modular components in the field to meet the specific needs of a mission or task. In some examples, the modular components include quick release mechanisms that include a set of locking elements for quickly and easily securing a modular component to a skid unit or vehicle cargo bed. In other examples, skid units include a combination of modular components that are fixed to the skid unit without a quick release mechanism, such as by bolts, welds, or other securing means.

In some examples, skid units of the present disclosure include a chassis, which can be made out of any of a variety of materials, such as aluminum and/or plastic, that is configured and dimensioned to fit into the rear cargo area of a vehicle, such as a utility vehicle (UTV) side by side or pickup truck.

In some examples, the skid unit chassis may include a lock box for storage of items, such as typical supplies, weapons, ammunition, medical bags, etc. The lock box may have a lockable door that may open all along the box top or two smaller doors that, in one example, have one opening towards the driver's side and one to the passenger side of the vehicle.

In some examples, the chassis may also include at least one locking element that is configured to releasably couple to a mating locking element disposed on a modular component for quickly attaching the modular component to the chassis. Modular components include, by way of non-limiting example, passenger seats, canine boxes, storage boxes, liquid tanks, pumps, artillery stations, ladders, injured patient transport units, and cadaver transport units, tool racks/holders, and generators among others. In one example, a first modular component in the form of a passenger seat and a second modular component in the form of a storage box, such as a canine storage box, each include at last one locking element located on a base of the modular component for locking to a mating locking element disposed on the bed of the skid unit chassis or disposed on the bed of a cargo area of a vehicle. In one example, a method of securing a first modular component, for example, a passenger seat, and a second modular component, for example, a storage box, to a cargo bed include lowering each of the modular components onto a corresponding locking element disposed on the cargo bed and then locking the modular component in place with a locking operation. In some examples, the locking operation is a snap-like function that may include moving the modular component in a linear direction, such as a forward or aft or lateral direction to secure the modular component to the chassis. In some examples, a skid unit and modular component may each include an anchor point and a safety strap may be secured to the two anchor points as a backup safety measure in the event a quick release mechanism failed to secure the modular component to the chassis.

Depending on the use or mission scenario, a skid unit chassis may be outfitted with a storage compartment and pair of modular components that are each releasably secured to the chassis, wherein the two modular components can be disposed on either side of the chassis. Example combinations of pairs of modular components include two passenger seats, two canine boxes, or a one passenger seat and one canine box, among others.

Figure 1B:
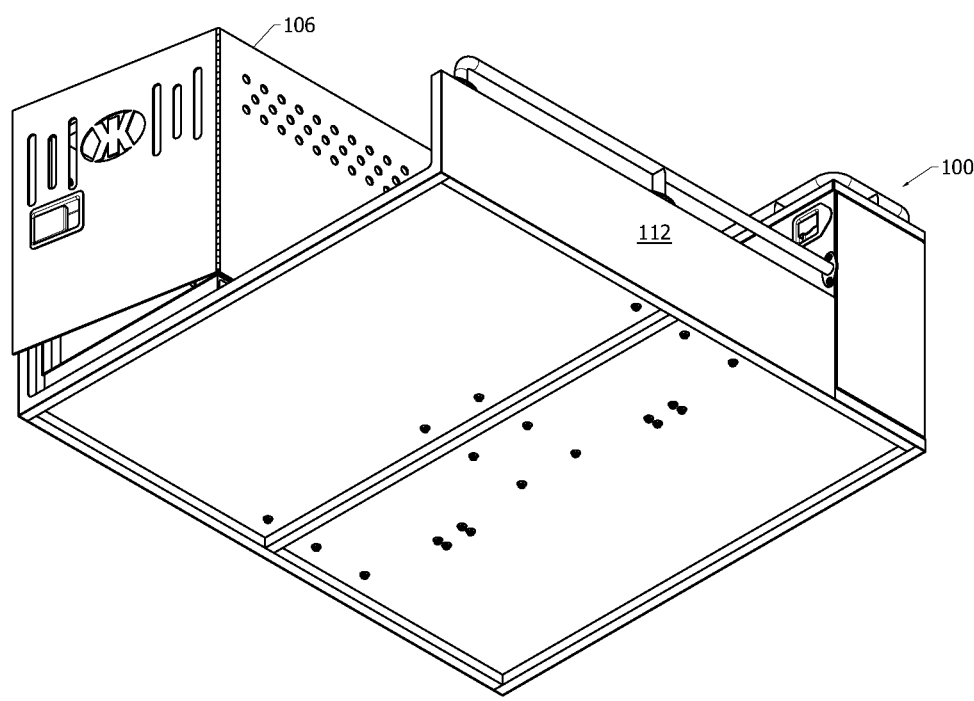
FIG. 1B is a bottom perspective view of the modular skid unit of FIG. 1A.
Figure 1C:
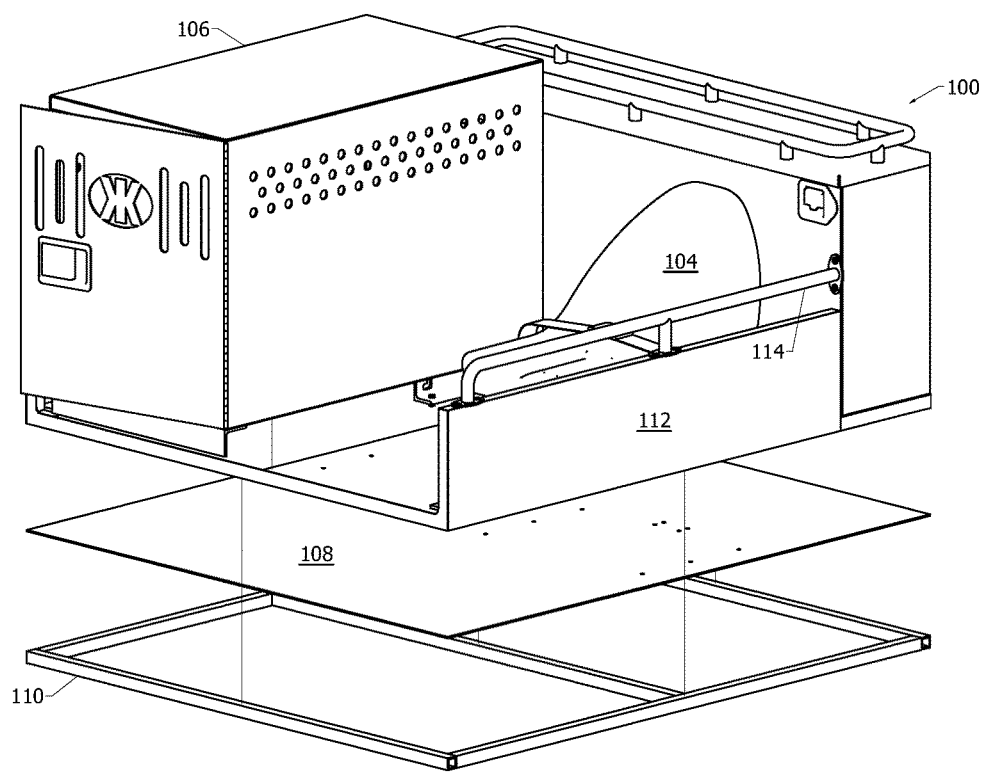
FIG. 1C is a perspective view of the modular skid unit of FIG. 1A with a partially exploded view of a portion of the chassis of the skid unit.
Figure 1D:
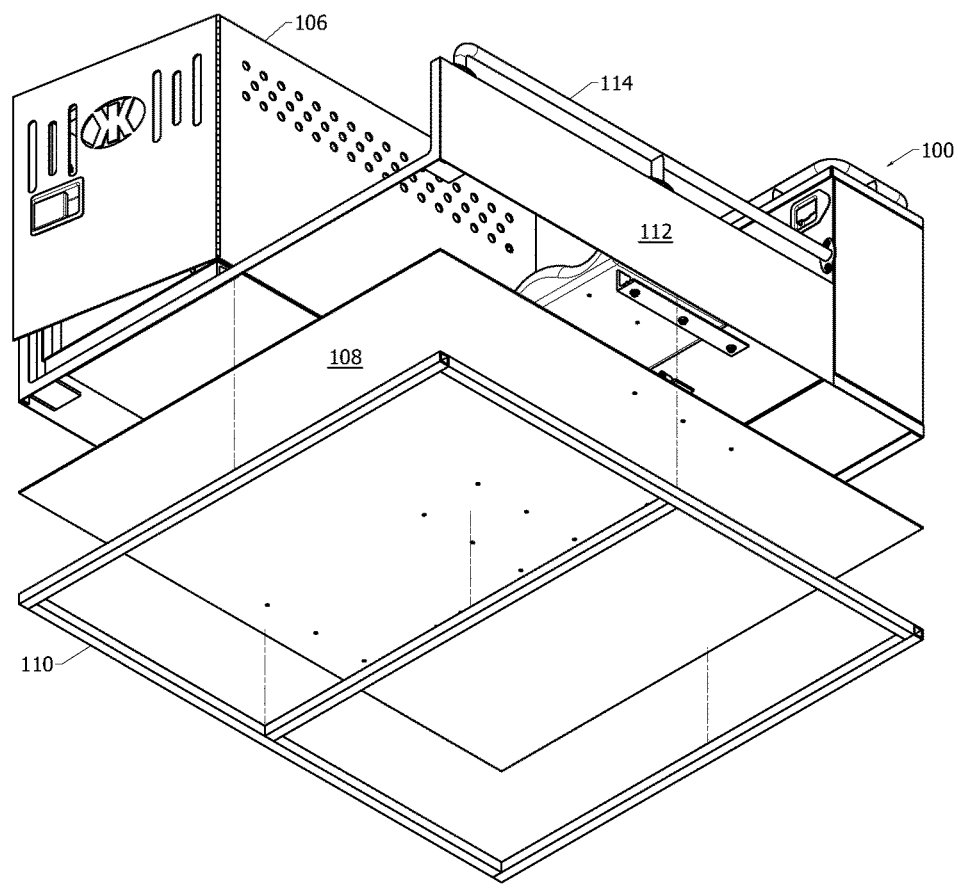
FIG. 1D is a bottom perspective view of the modular skid unit of FIG. 1A with a partially exploded view of a portion of the chassis of the skid unit.
Figure 2A:
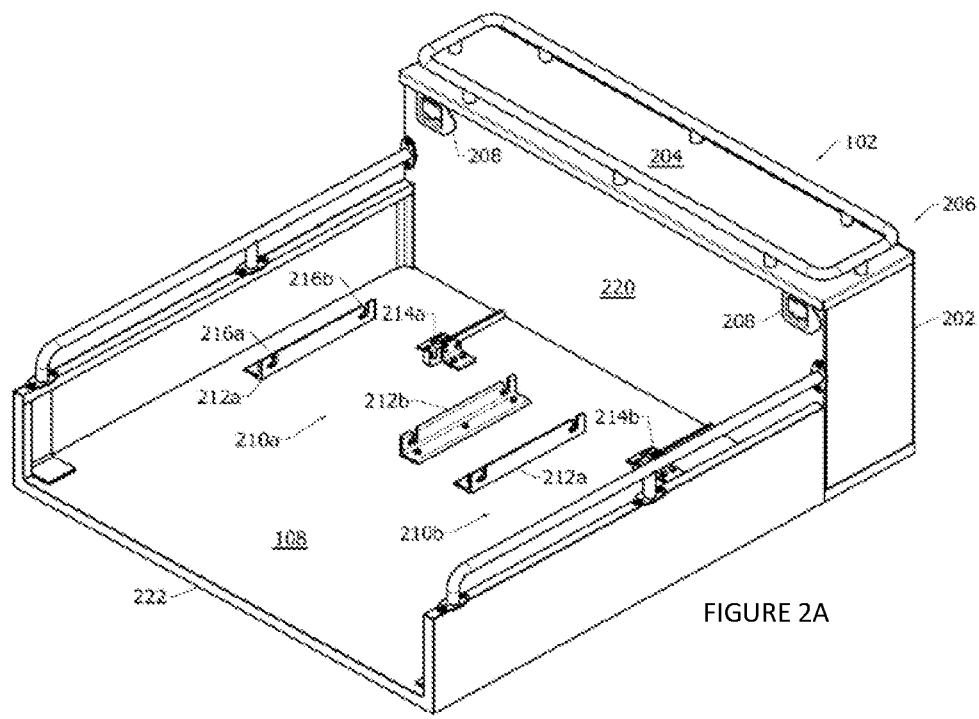
FIGS. 2A-2D are perspective, top view, top perspective, and front views of the skid unit chassis of FIG. 1A showing the bed portions of two quick release assemblies.
Figure 2B:
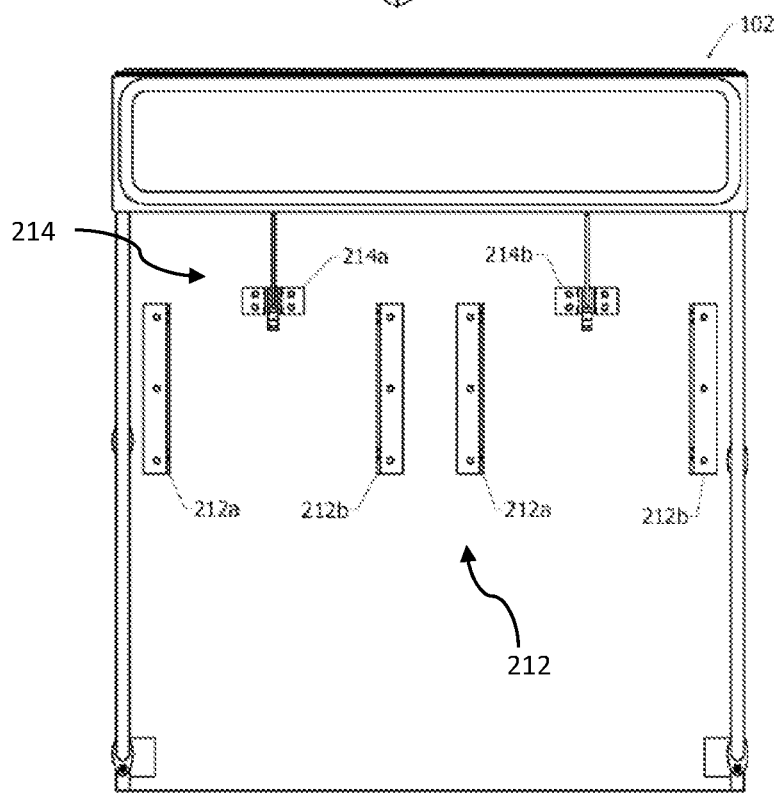
Figure 2C:
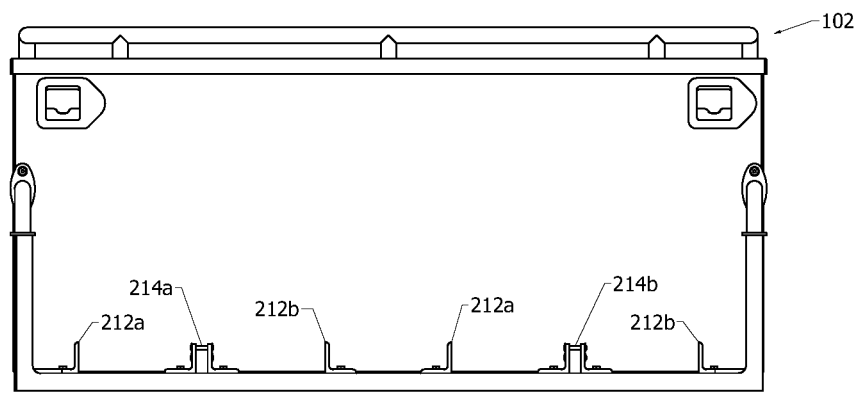
Figure 2D:
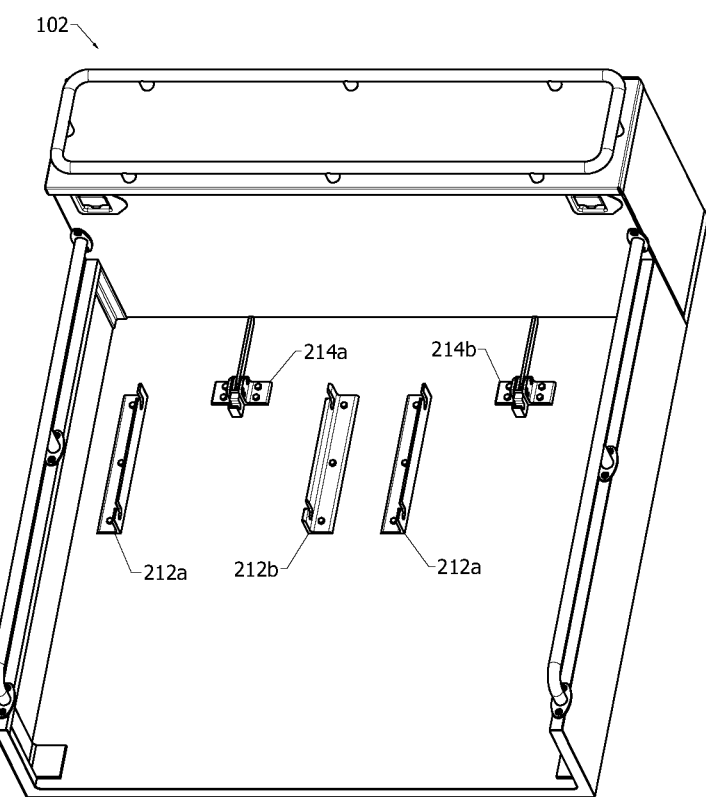

FIGS. 1A-1D illustrate one example of a modular skid unit 100 made in accordance with the present disclosure. FIGS. 1A and 1B are top and bottom perspective views and FIGS. 1C and 1D are top and bottom perspective exploded views of the modular skid unit. The configuration shown in FIG. 1 includes a chassis 102 and two modular components attached to the chassis. In the illustrated example, the two modular components are a passenger seat 104 and a canine box 106. In the illustrated example, the chassis 102 includes a cargo bed 108 formed from, for example, a plate of 1/8" thick aluminum diamond plate that is reinforced with a frame 110 (FIG. 1C) formed from structural members, for example, 1" aluminum square tubing. In the illustrated example the frame 110 includes tubing positioned along an outer perimeter of the bed and at least one additional cross member from one side to the other evenly spaced along the axis line to form extra support under the cargo bed 108. It is appreciated that the frame 110 can be constructed from materials other than 1" square aluminum tubes such as round tubing, rods, or angle members formed from the same or alternate materials. Similarly, the cargo bed 108 can be formed from alternate materials, such as sheets or plates of alternate metals or plastic. In one example, the frame 110 is attached to the cargo bed 108 with rivets, such as aircraft quality high tensile strength rivets. In other examples alternative or additional fasteners such as nuts and bolts or welding the parts together may be used. In one example, rivets are utilized to allow for flexure of the chassis 102 to enable the skid unit 100 to be subjected to intense stress and flexing when used in off road conditions. The chassis 102 can be made to any size to fit the size of a corresponding vehicle such as a side by side or pickup truck. In one example, the chassis is 48" wide by 55" long.

As shown in FIGS. 1A-1D, in the illustrated example, the chassis 102 includes sides 112 attached to and extending vertically from three sides of the cargo bed 108 to form the interior space of the skid unit 100. In one example, the sides 112 include a plate material, such as aluminum diamond plate fastened to a frame, such as a frame of aluminum tubing, by rivets or other fasteners. The sides 112 provide structure and added strength to the skid unit 100 and are attached to the cargo bed 108. In the illustrated example, the skid unit 100 also includes hand rails 114 attached to each side at the proper height for easy use by the occupants of the skid unit.

FIGS. 2A-2D show various views of the chassis 102 with the seat 104 and canine box 106 removed. As shown in FIG. 2, the chassis includes a storage box 202 located at the front of the chassis and that forms one of the sides of the skid unit. The storage box 202 can be constructed from any material known in the art, such as aluminum diamond plate fastened to a frame, such as a frame of 1" square tubes. In the illustrated example, the storage box 202 has a top 204 attached to the main structure of the box through use of a hinge 206 running the entire length of the top on one side of the box. The top 204 is outfitted with two latches 208 that allow the box top to be opened from either side of the skid unit. It can be appreciated that other means can be incorporated in the securing and latching of the top 204 of the box 202. The storage box 202 can have a water tight configuration and may provide a secure and dry space from the elements to securely and dryly store emergency medical equipment supplies, weapons or other munitions, etc. In the illustrated example, the storage box 202 extends across a width of the skid unit 101 and defines a front wall 220 of the skid unit, the storage box including a unitary top 204 that has a length that is approximately the same as the width of the skid unit and is pivotally attached to the storage box by the hinge 206, the top and hinge defining a waterproof opening of the storage box 202. In other examples, skid units of the present disclosure may not include a storage box and the storage box can be made out of materials other than aluminum such as welded plastic.

FIGS. 2A-2D show bed portions 210a, 210b of two quick release assemblies 211a and 211b (FIG. 3E) that are designed and configured to quickly, easily, and releasably secure modular components, such as the seat 104 and canine box 106 (FIG. 1A) to the chassis 102. In the illustrated example, each quick release assembly 211 includes a pair of first locking elements configured to releasably engage with a pair of second locking elements to releasably secure a modular component to the chassis 102. In the illustrated example the first locking elements are in the form of a pair of brackets 212a, 212b. Each of the quick release assemblies 211 further include a locking mechanism 214 attached in a specific location in the cargo bed 108 as shown in order to engage with the second locking elements of a corresponding modular component when the modular component is positioned over the bed portion 210 of the quick release assembly 211. In the illustrated example, each of the brackets 212 is oriented in a forward-aft direction on the cargo bed 108 and each of the brackets 212 include two receiving channels 216a, 216b (only one of each labeled in FIG. 2A) configured to receive a portion of a second locking element to thereby secure a modular component to the chassis 102. In the illustrated example, the brackets 212 and locking mechanisms 214 are directly attached to the cargo bed 108 of the chassis 102. In other examples, the brackets 212 and locking mechanisms 214 may be disposed on a separate base, such as a metal plate, that is then attached to the bed of the chassis as one complete unit. In the illustrated example, the locking mechanisms 214 are located in a front portion of the chassis cargo bed 108 between where a modular component would be attached and a front wall 220 of a cargo bed area the chassis 102. In other examples, the locking mechanism 214 may be located on the opposite side of a modular component between the modular component and a rear end 222 of the chassis 102 or may be located on a left or right side of a modular component. In the illustrated example, each pair of brackets 212 are located on the cargo bed 108 to accept corresponding second locking element located on the base of a modular component (see, e.g., FIG. 4A). A modular component may include at least one second locking element configured to be releasably engaged to a corresponding bracket 212 or alternate first locking element to couple the modular component to the cargo bed 108 of the chassis 102. In other examples, one or both of the seat 104 and canine box 106 may be secured to the chassis 102 in an alternate way. For example, instead of quick release assembly 211, one or both of the seat 104 and canine box 106 may be attached to the chassis by means of fasteners such as screws or bolts and/or welded to the chassis. In some examples, one of the modular components may be secured to the chassis without a quick release mechanism and one may be secured with a quick release mechanism. For example, seat 104 may be permanently attached to chassis 102, for example, by bolts and/or welds, and canine box 106 may be releasably attached, for example, by quick release assembly 211, so that one of a plurality of modular components can be interchangeably installed in the skid unit for use with the seat 104 depending on a particular use. In yet other examples, two modular components, such as the seat 104 and canine box 106 may be coupled together and secured to the chassis 102 with a single quick release mechanism. For example, the skid unit may include a single pair of brackets 212 and a single locking mechanism 214 and both the seat 104 and canine box 106 may be disposed on one or more metal plates, the metal plates including a single modular component portion 302 for releasably attaching to a single bed portion 210 of a single quick release assembly.

Figure 3A:
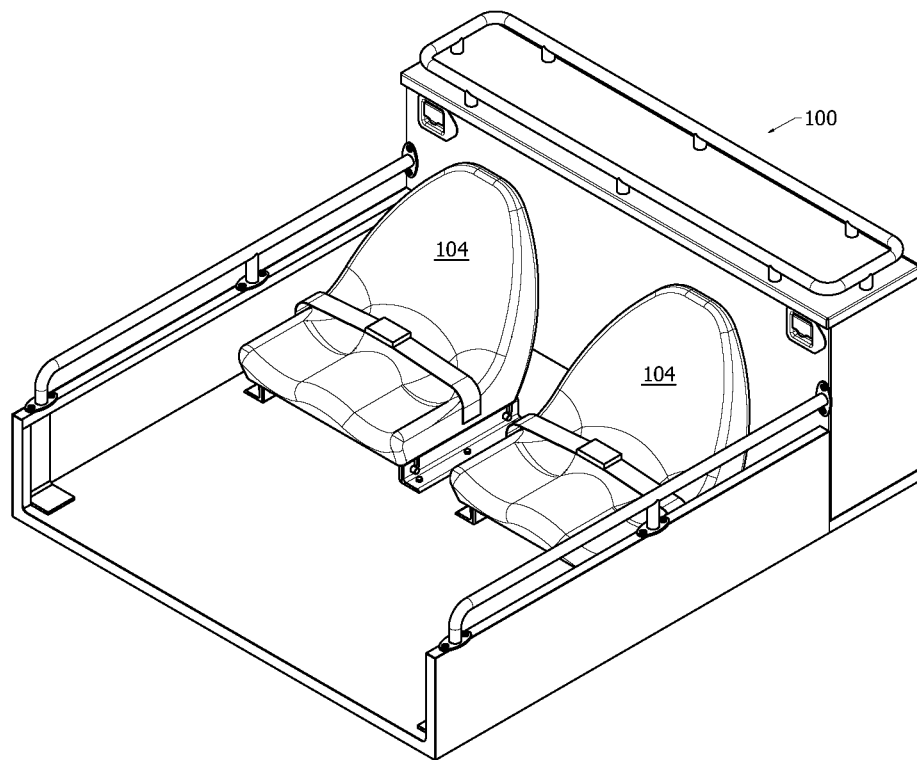
FIG. 3A shows one example of a modular skid unit with two passenger seats releasably secured to the skid unit with corresponding quick release assemblies.
Figure 3B:
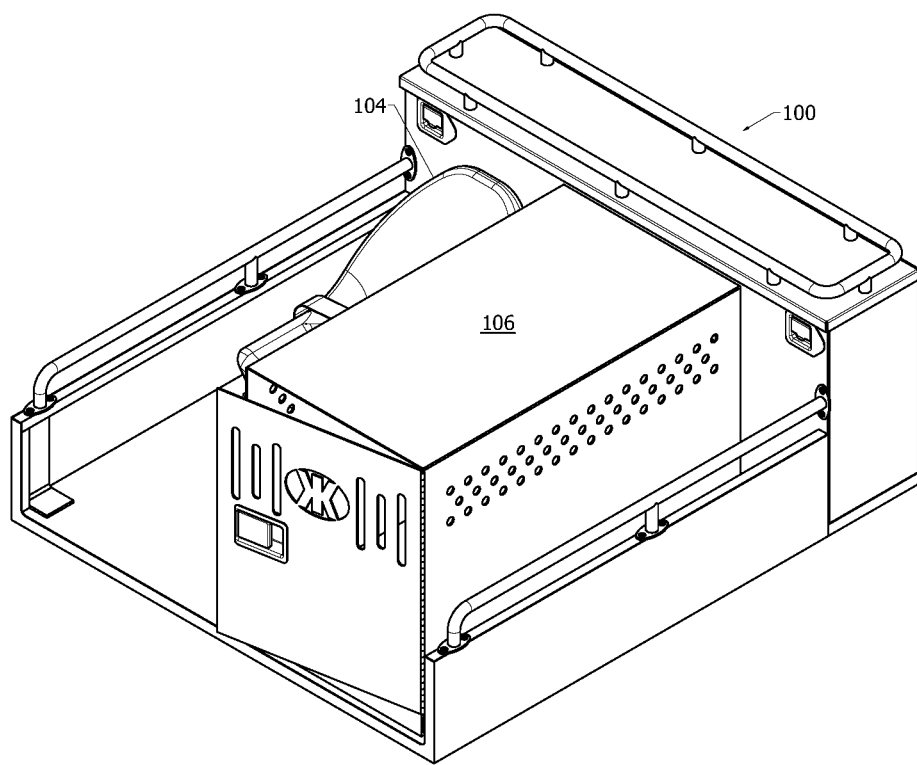
FIG. 3B shows one example of a modular skid unit with a passenger seat and a canine box each releasably secured to the skid unit with corresponding quick release assemblies.
Figure 3C:
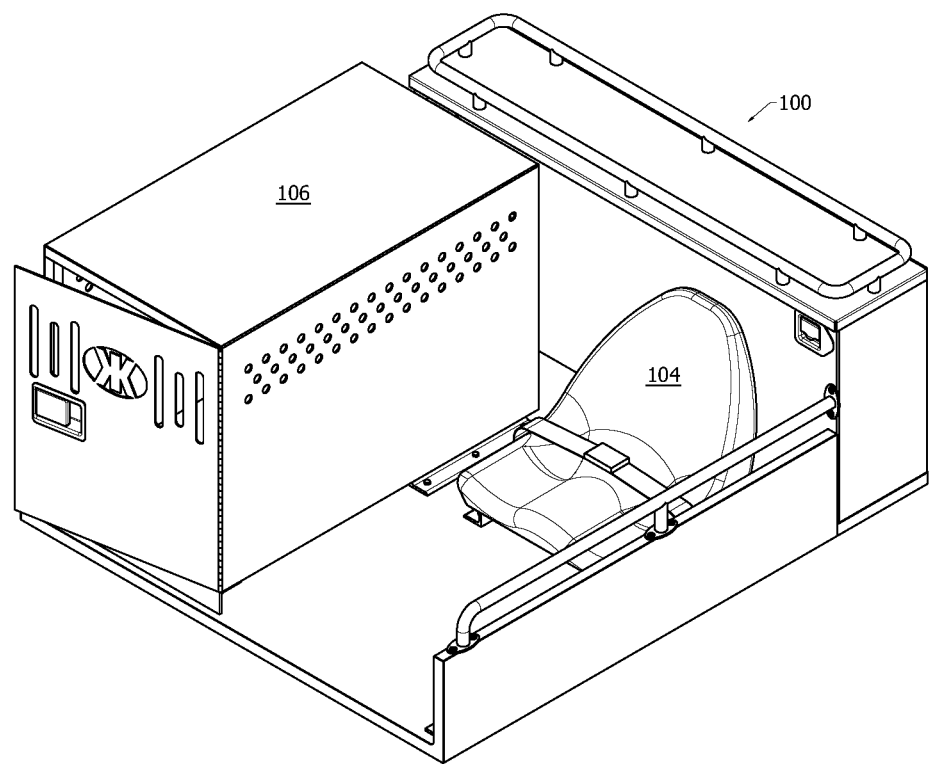
FIG. 3C shows another example of a modular skid unit with a passenger seat and a canine box each releasably secured to the skid unit with corresponding quick release assemblies.
Figure 3D:
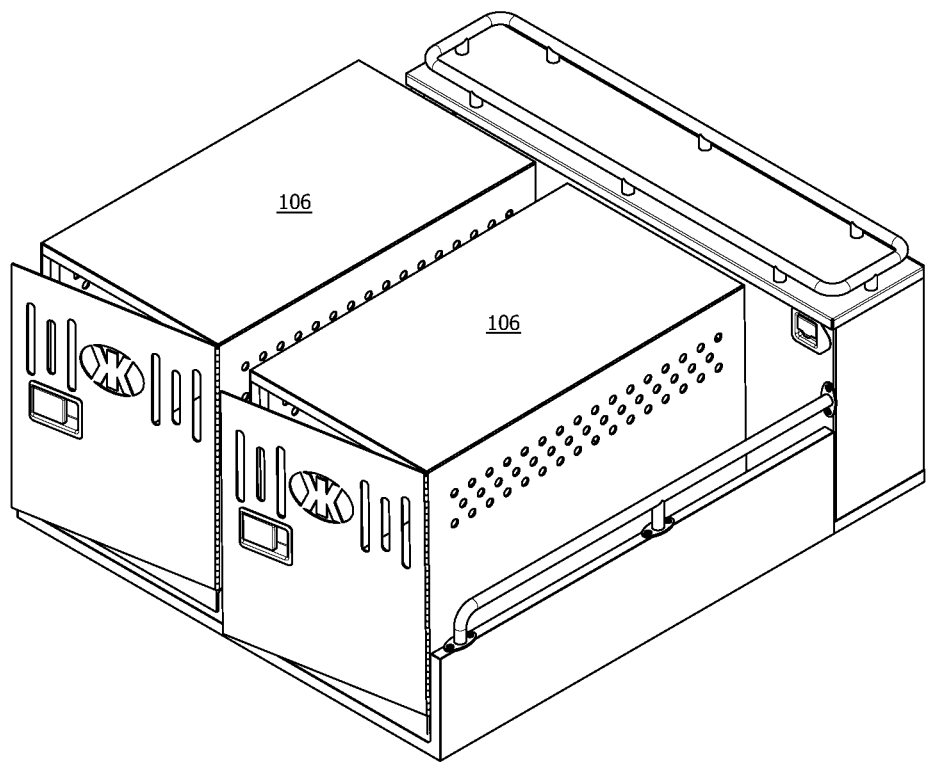
FIG. 3D shows one example of a modular skid unit with two canine boxes each releasably secured to the skid unit with corresponding quick release assemblies.
Figure 3E:
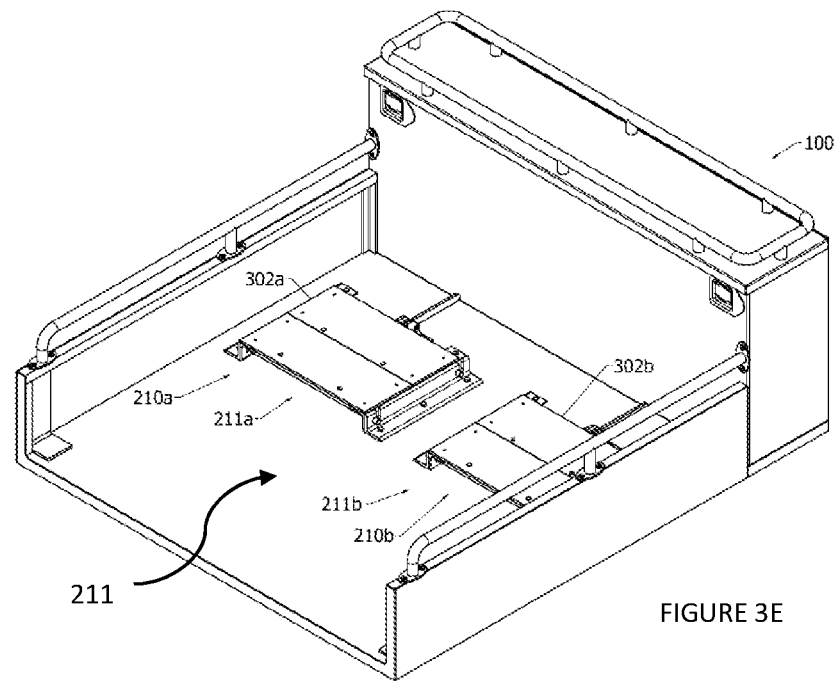
FIG. 3E shows a modular skid unit with quick release assemblies attached to the skid unit and with no modular components attached to the quick release assemblies.
Figure 3F:
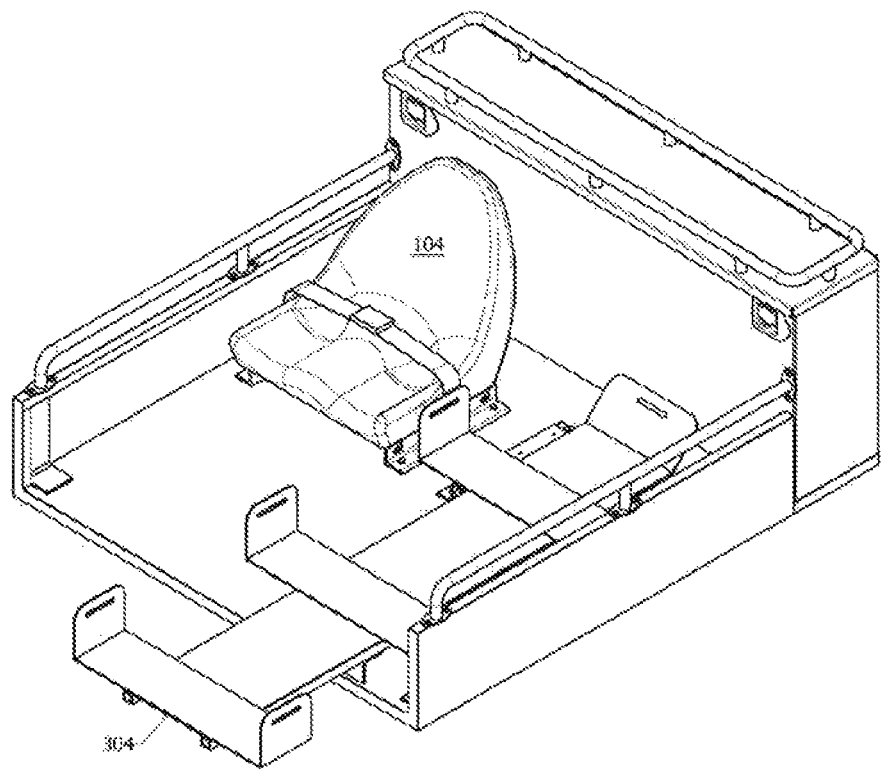
FIG. 3F shows one example of a modular skid unit with a passenger seat and a patient transport unit each releasably secured to the skid unit with corresponding quick release assemblies.
Figure 4A:
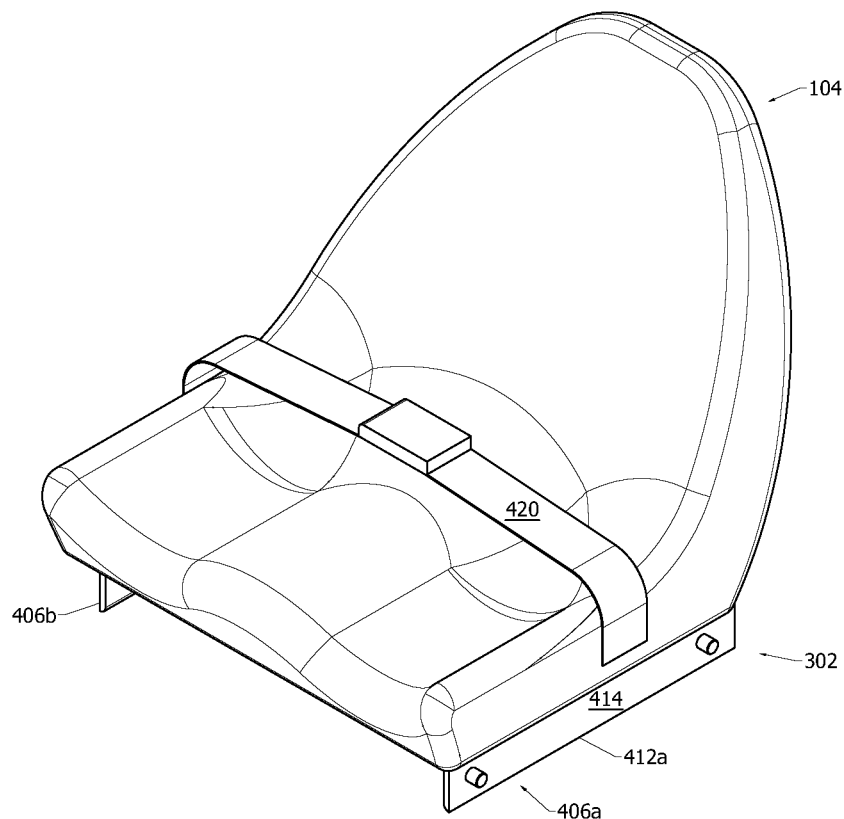
FIGS. 4A-4D are perspective, front view, side view, and bottom view of the passenger seat of FIG. 1A with the module portion of the quick release assembly attached to the base of the seat.
Figure 4C:
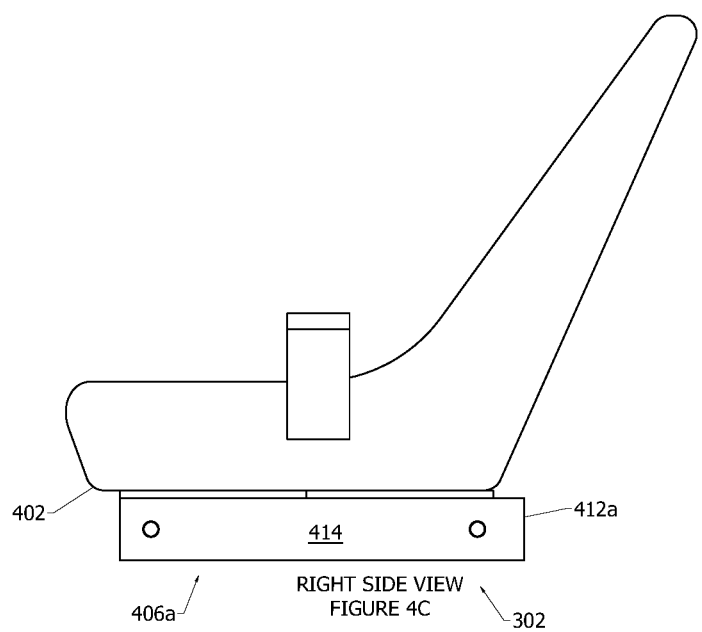
Figure 4B:
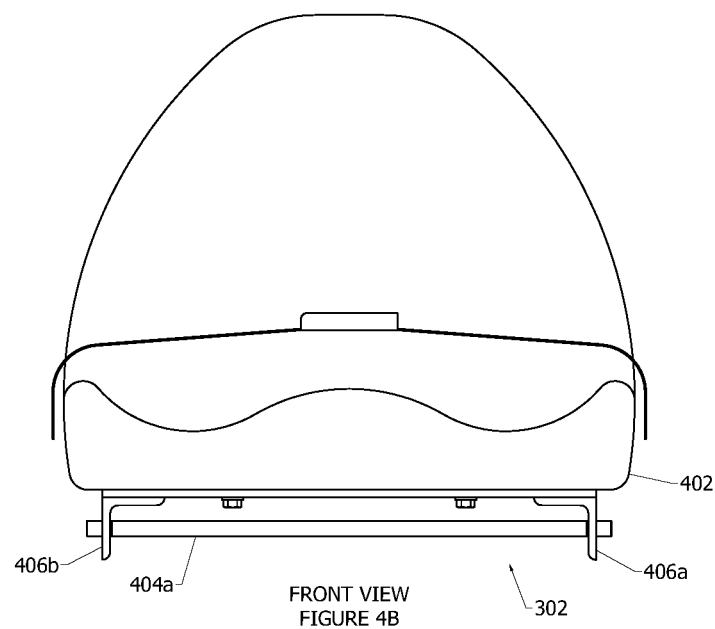
Figure 4D:
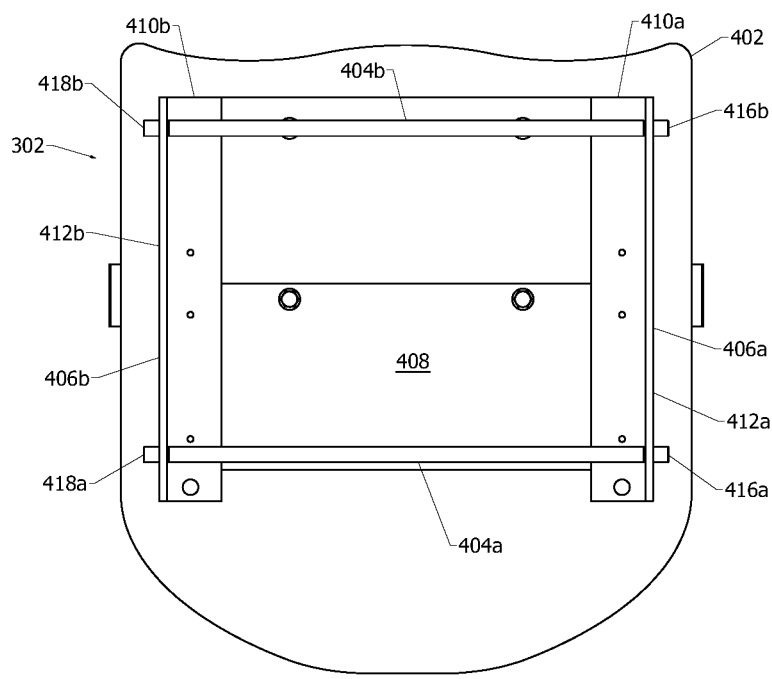
Figure 5A:
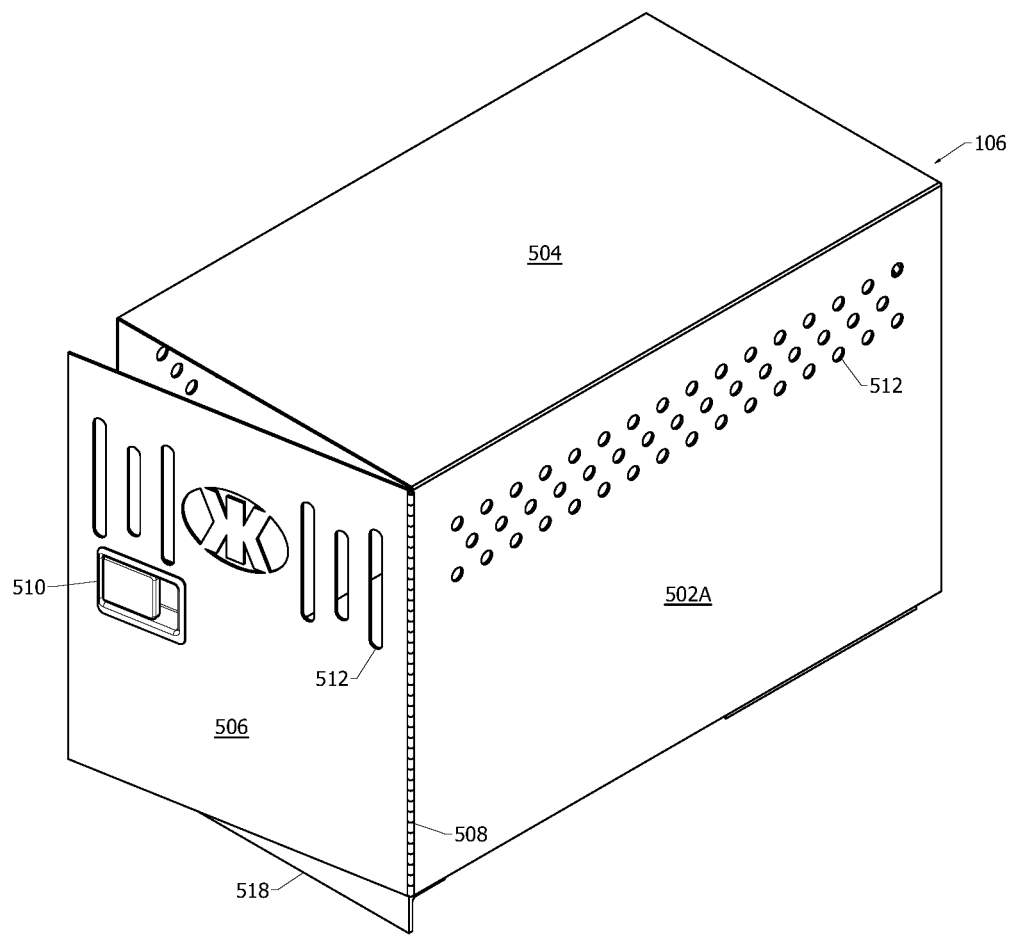
FIGS. 5A-5D are perspective, front view, side view, and bottom view of the canine box of FIG. 1A with the module portion of the quick release assembly attached to the base of the canine box.
Figure 5B:
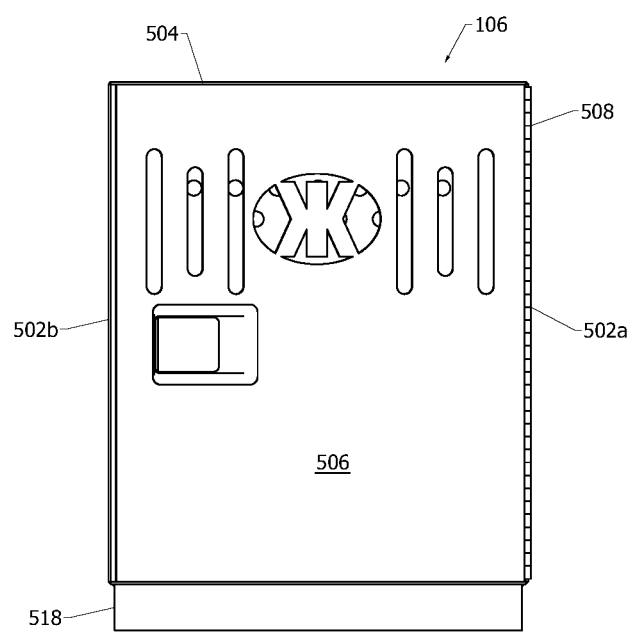
Figure 5C:
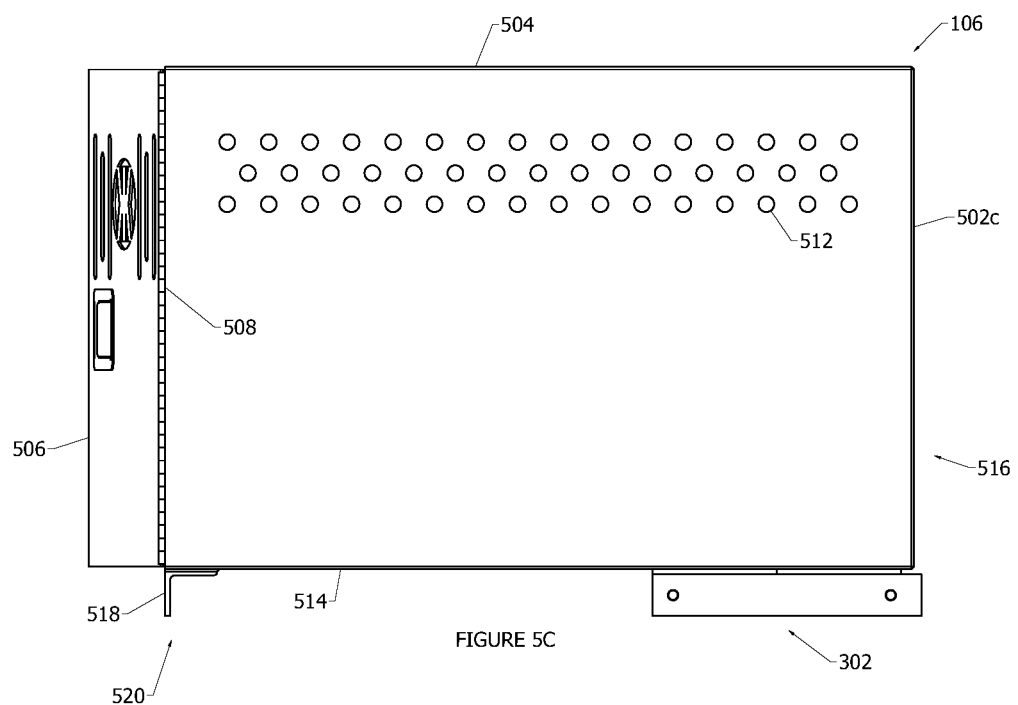
Figure 5D:
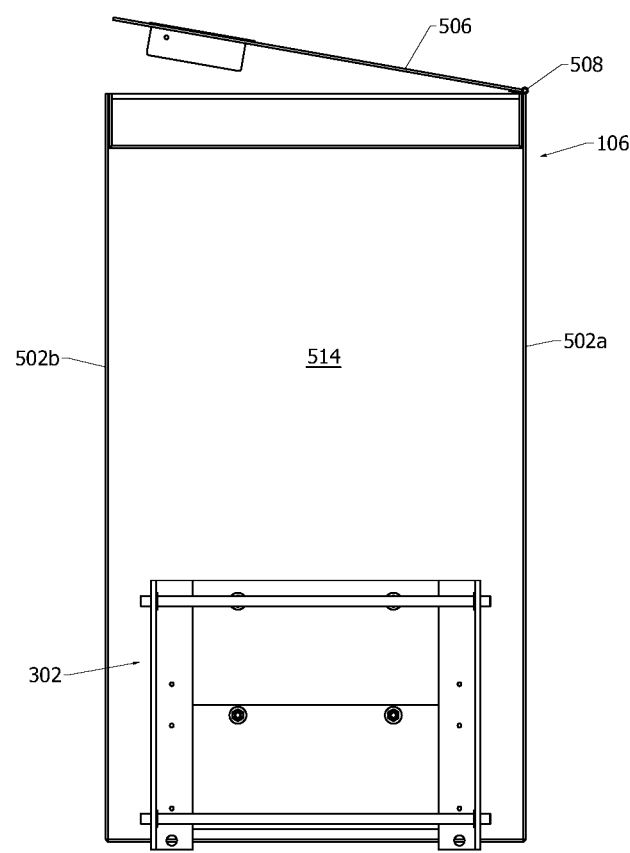

FIGS. 3A-3F show various example configurations of modular components releasably secured to skid unit 100 using quick release assemblies 211. FIG. 3A shows one configuration where two passenger seats 104 with seat belts are installed and releasably secured in the skid unit 100. FIG. 3B shows another configuration that includes one passenger seat 104 and one canine box 106 each releasably secured to the skid unit 100. FIG. 3C shows a similar configuration to FIG. 3B with the locations of the passenger seat 104 and canine box 106 swapped. FIG. 3D shows another configuration with two canine boxes 106 releasably secured to the skid unit 100 in a side by side configuration. FIG. 3E shows two quick release assemblies 211a, 211b positioned in the chassis 102. For ease of illustration, FIG. 3E shows full quick release assemblies 211 including the modular component portions 302a, 302b secured to the bed portions 210a, 210b but with the modular components omitted from the illustration. FIG. 3F shows one example of the modular skid unit 100 that includes the passenger seat 104 and a patient transport unit 304 each removably coupled to the skid unit 100. FIGS. 3A-3F show example combinations of modular components that may be quickly attached to skid unit 100 according to a particular desired use of the skid unit. In each case the same quick release assembly 211 can be used to attach a designed modular component and in the illustrated example, only one quick release assembly 211 is required to secure a given modular component to the chassis 102. Also, in the illustrated example, a single motion of a single hand-operated lever 612 is the only step required to lock or unlock a modular component from the chassis, making the attachment and detachment quick and easy. In the illustrated example, the seat 104 is designed to securely support an adult weighing less than or equal to 400 pounds, and in some examples, less than or equal to 300 pounds, and in some examples, less than or equal to 250 pounds. Similarly, the patient transport unit is designed to securely support an adult weighing less than or equal to 400 pounds, and in some examples, less than or equal to 300 pounds, and in some examples, less than or equal to 250 pounds. The canine box is designed to safely and securely transport a dog or other animal weighing less than or equal to 200 pounds. Quick release assembly 211 is a universal quick release assembly that can securely attach any of the foregoing modular components and others along with the intended payload secured to the modular component. In one example, the quick release assembly 211 is designed and configured to secure, as the sole point of attachment, a modular component where the combined weight of the modular component and payload is up to 400 pounds and in some examples, up to 500 pounds. In alternate examples, any combination of the modular components disclosed herein may be secured to a skid unit or vehicle by means other than a quick release assembly, such as permanently attached to a skid unit or vehicle by fasteners such as screws and/or bolts and/or welds.

FIGS. 4A-4D are perspective, front, side, and bottom views, respectively, of seat 104 and the modular component portion 302 of quick release assembly 211 secured to a base 402 of the seat. In the illustrated example seat 104 is designed to comfortably and securely support an adult in the cargo area of the skid unit, the seat including at least one seat belt 420 for securing the passenger in the seat. In one example, the seat 104 is primarily made from plastic, foam and sheet metal and designed to securely support an adult, for example, in the cargo area of a vehicle. Modular component portion 302 includes at least one second locking element configured to engage at least one of the first locking elements of the bed portion 210 of the quick release assembly 211. In the illustrated example, the at least one second locking element includes a spaced apart pair of elongate members 404a, 404b in the form of rods. In other examples, the elongate members 404 may have any of a variety of cross sectional shapes, including round, oval, rectangular or any other polygon shape and may have a solid cross section, such as a rod, or one or more cavities, such as a tube. The elongate members are secured to and spaced from the base 402 of the seat 104 by a pair of brackets 406a, 406b. In the illustrated example, each of the brackets 406 are secured to at least one plate 408 and the plate is secured to the base 402 of the seat 104. In other examples, the at least one plate 408 may be omitted at the brackets 406 may be directly attached to the base 402 of the seat 104 or other modular component. Each of the brackets 406 include a first member 410a, 410b that is directly secured to the plate 408 and a second member 412a, 412b that is directly coupled to the elongate members 404. In the illustrated example, the brackets 406 are angle members and the first and second members 410, 412 are located at right angles to each other.

The second members 412 of the brackets 406 each have an outer surface 414 (labeled in FIGS. 4A and 4C) and the elongate members 404 each have a first end 416a, 416b, and a second end 418a, 418b. In the illustrated example, the elongate members 404 have a length that is approximately the same as a width of the quick release assembly 211 and approximately the same as a width of a modular component and the elongate members 404 extend fully though the second members 412 of the brackets 406 and the first ends 416 and second ends 418 protrude from the outer surfaces 414 of the second members 412. As described below and illustrated in FIGS. 6A-6F, the first ends 416 and second ends 418 of the elongate members 404 are configured to be disposed in the receiving channels 216 of the brackets 212 to releasably engage the first and second locking elements.

Any of a variety of alternate configurations to the configuration shown in FIGS. 4A-4D may be made in accordance with the present disclosure. For example, in the illustrated example, each of the elongate members 404 has a length that extends across the module portion 302 of the quick release assembly 211 and each extend from bracket 406a to bracket 406b. In alternate examples, each bracket 406 may include a separate protrusion for engaging one of the first locking elements (such as brackets 212) rather than the first and second ends 416 and 418 of an elongate member 404 extending between two brackets 406. As another example of alternate configurations, the first connection members secured to the cargo bed 108 of skid unit 100 may include a protrusion, elongate member, or other male component that is designed to engage with a slot, recess, or other female component located in a second connection member secured to a base of a modular component. In yet another example, each of the first and second connection members may include a combination of male and female components configured to releasably engage with a corresponding combination of male and female components located in the other one of the first and second connection members.

FIGS. 4A-4D show one example of the module portion 302 of the quick release assembly 211, where the module portion includes the at least one plate 408, a pair of spaced apart brackets 406 secured to the plate, and a pair of spaced apart elongate members 404 secured to the brackets. In the example of FIGS. 4A-4D, the module portion 302 of the quick release assembly 211 is secured to seat 104 so that the seat can be releasably secured to chassis 102. As can be appreciated, the module portion 302 of the quick release assembly 211 can similarly be attached to virtually any modular component for releasably securing the modular component to the chassis 102 of the skid unit 100, or to the cargo bed of another structure, such as directly to the cargo bed of a pickup truck or UTV.

FIGS. 5A-5D show one example where the canine box 106 includes the module portion 302 of the quick release assembly 211 for releasably securing the canine box to the chassis 102 or other structure. In the illustrated example, the walls of the canine box 106 may be constructed from plates of a variety of materials, for example, aluminum diamond plate and secured to a frame (not illustrated), for example, a frame of aluminum tubing for structural strength, or a frame may be omitted and the plates welded or otherwise secured together. In other examples, the walls of the canine box 106 can be made from other materials such as polypropylene or wood sheets. In the illustrated example, the canine box has three sides 502a, 502b, 502c and a top 504 with a full door 506 on the end of the box which is attached with a hinge 508 and outfitted with a latch 510 to secure the door 506. The sides 502 and door 506 each include a plurality of openings 512 (only some labeled) for ventilation, visibility, and/or to provide daylighting for an interior of the box. The canine box is designed to transport at least one dog and the sides 502 and top 504 define an interior volume that is configured and dimensioned to house at least one dog for storage and transport of the dog. One of the module portions 302 of the quick release assembly 211 is secured to a base 514 of the canine box 106 and in the illustrated example the module portion 302 is located at a back end 516 of the canine box. The canine box 106 also includes a support 518 that is secured to the base 514 at a front end 520 of the canine box that is designed and configured to support the front end of the box on the cargo bed 108 of the chassis 102 or other cargo area, the support 518 having a height that is substantially the same as a height of the quick release assembly 211 so that the base 514 of the canine module is parallel to the cargo bed when the canine box 106 is installed in the skid unit 100 or vehicle. In the illustrated example, the support 518 is an angle bracket with a first member directly secured to the base 514 and a second member disposed at a right angle to the first member and designed to extend from the base 514 and come into contact with the bed of the skid unit.

Figure 6A:
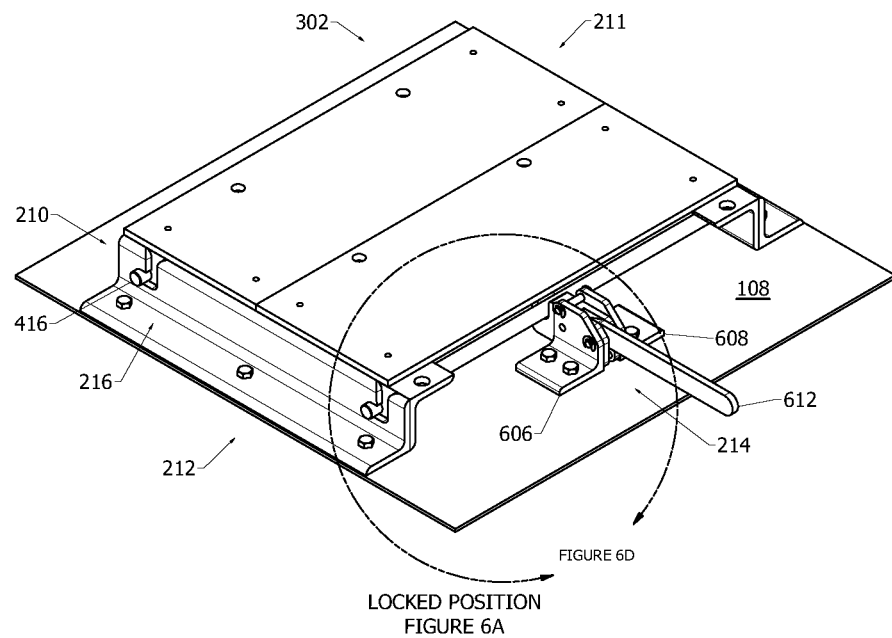
FIGS. 6A-6C show the quick release assembly of FIG. 3E in a locked, unlocked, and removed configuration.
Figure 6D:
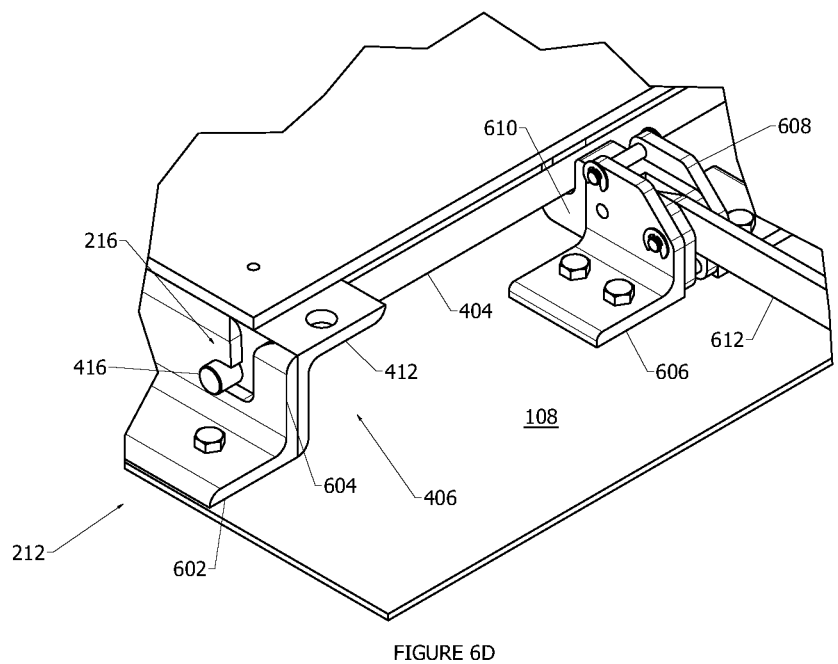
FIGS. 6D-6F are detail views of corresponding portions of FIGS. 6A-6C.
Figure 6B:
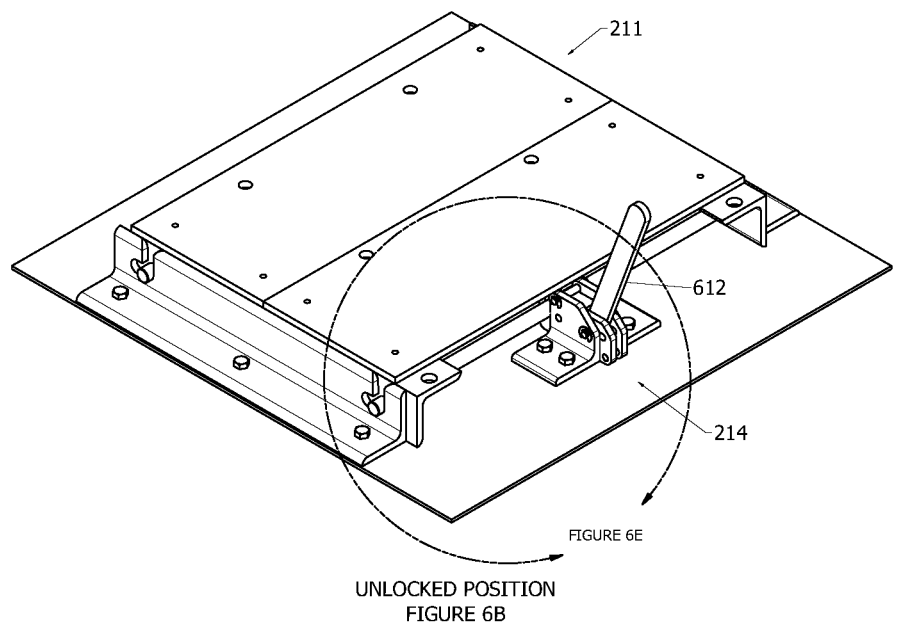
Figure 6E:
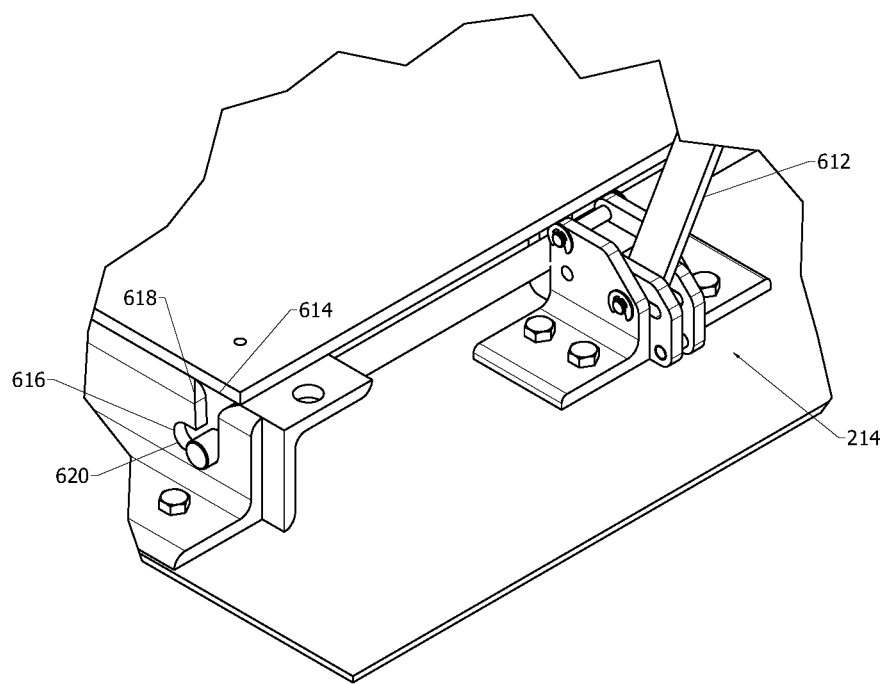

FIGS. 6A-6F further illustrate the quick release assembly 211 and show the bed portion 210 and module portion 302 transitioning from a locked configuration (FIGS. 6A and 6D) to an unlocked configuration (FIGS. 6B and 6E). In the locked position illustrated in FIGS. 6A and 6D, the ends 416 and 418 of the elongate members 404 are disposed in the receiving channels 216 of the brackets 212 to secure the bed portion 210 and module portion 302 together in the locked configuration. Brackets 212 are angle members that include first members 602 (FIG. 6D) secured to cargo bed 108 and second members 604 that define the receiving channels 216. As shown in FIGS. 6A and 6D, the brackets 406 of module portion 302 are located and dimensioned so that they are positioned between the brackets 212 of bed portion 210 when assembled in the locked position with the outer surfaces of the second members 412, 604 being parallel and adjacent, and in some examples, in sliding contact, when assembled.

Figure 6C:
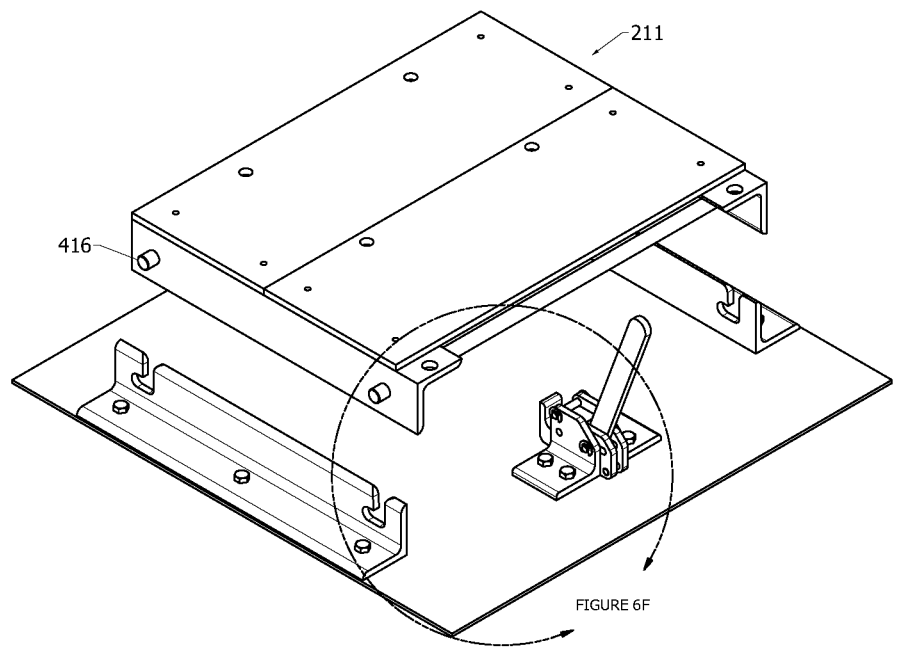
Figure 6F:
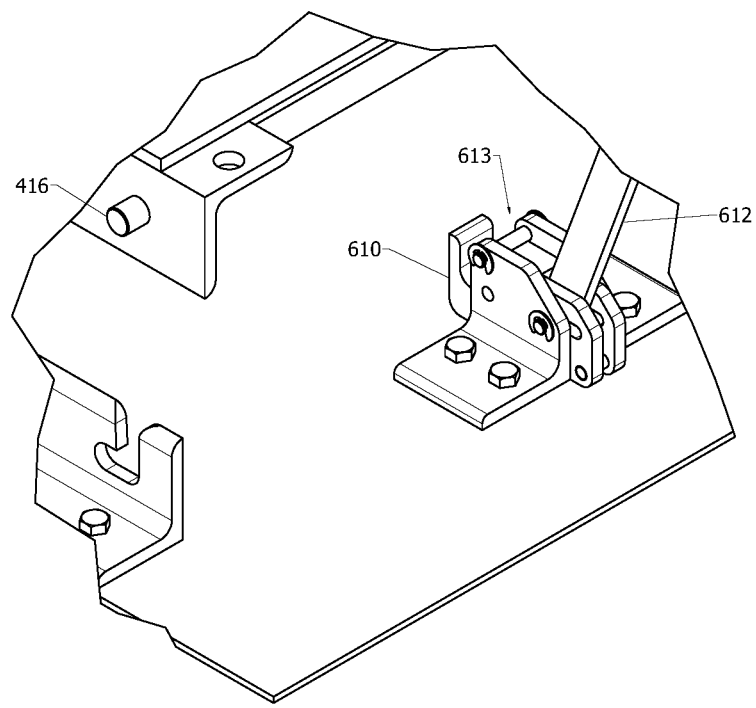

In the illustrated example, locking mechanism 214 includes a first bracket 606 and a second bracket 608 for attaching the locking mechanism to the cargo bed 108, a catch 610 and a hand-operated lever 612 operably coupled to the catch and configured to move the catch between a locked position (FIG. 6D) and an unlocked position (FIGS. 6E and 6F). The catch 610 includes a recess 613 that is configured and dimensioned to receive a portion of one of the elongate members 404 when the module portion 302 is positioned on the bed portion 210. Receiving channels 216 of the brackets 212 of bed portion 210 include an open first end 614 and a closed second end 616 and are angled and include a first vertical portion 618 and a second horizontal portion 620 (labeled in FIG. 6E). In the locked position shown in FIG. 6D, the catch 610 has pushed the elongate member 404 (along with the rest of the module portion 302 and any module attached to it) in a horizontal direction along the second portion 620 of the channel 216 until the ends 416, 418 of the elongate member 404 come into contact with the closed ends 616 of the receiving channels 216. The locking mechanism 214 thereby maintains the first and second locking elements in the locked position by preventing the elongate members 404 from moving back towards the open ends 614 of the receiving channels 216 and the walls of the receiving channels 216 prevent movement of the elongate members 404 (and the rest of the module portion 302 and any module attached to it) from movement in any other direction. In the illustrated example, the recess 613 of catch 610 is aligned with two of the receiving channels 216 on opposed brackets 212 so that an elongate member 404 can be simultaneously disposed in the receiving channels and the recess of the catch. When in the locked position, the recess 613 is substantially aligned with an axis that extends from one of the closed ends 616 to the closed end 616 of the receiving channel in an opposing bracket 212. When in the unlocked position the recess 613 is substantially aligned with an axis that extends from the first portion 618 of one of the receiving channels to the first portion 618 of a receiving channel in an opposing bracket 212.

FIGS. 6B and 6E show the hand operated lever 612 rotated from the horizontal locked position shown in FIGS. 6A and 6D to a raised unlocked position, which causes the catch 610 to move in a horizontal direction from the position shown in FIG. 6D to the position shown in FIG. 6E, thereby pulling the elongate member 404 that is disposed in the recess 613 along the second portions 620 of the receiving channels 216 until the elongate member 404 is aligned with the first portions 618 of the receiving channels. As shown in FIGS. 6C and 6F, with the catch 610 in the unlocked position and the elongate members 404 aligned with the first portions 618 of the receiving channels 216, the module portion 302 (and any modular component attached to it) can be lifted off of the bed portion 210 and removed from the skid unit 100 or other vehicle it was secured to.

To install a modular component using one of the quick release assemblies 211 the reverse process is employed. Namely, the elongate members 404 of a module portion 302 are positioned over and aligned with receiving channels 216 and lowered down onto the bed portion 210, thereby sliding the elongate members 404 along the first portions 618 of the receiving channels 216 and positioning one of the elongate members 404 in the recess 613 of the catch 610 of the locking mechanism 214 resulting in the unlocked position shown in FIGS. 6B and 6E. The lever 612 can then be rotated down from the raised unlocked position to the lowered locked position, thereby causing the catch 610 to move in a horizontal direction, which causes the catch to push the elongate member 404 disposed in the catch 610 in a horizontal direction along the second portions 620 of the receiving channels 216 until the elongate members reach the ends 616 of the receiving channels and the catch 610 and lever 612 are in the locked position (the position shown in FIGS. 6A and 6D). In the illustrated example, after positioning the elongate member 404 in the catch 610 of the locking mechanism, the lever 612 of the locking mechanism will not move to the locked position unless the elongate member is properly seated in the angled receiving channels 216 because if the elongate member is in the vertical first portion 618 of the receiving channels, it will not be able to move in the required horizontal direction to the locked position. This prevents a user from mistakenly thinking a modular component is secured when it is not.

Figure 7A:
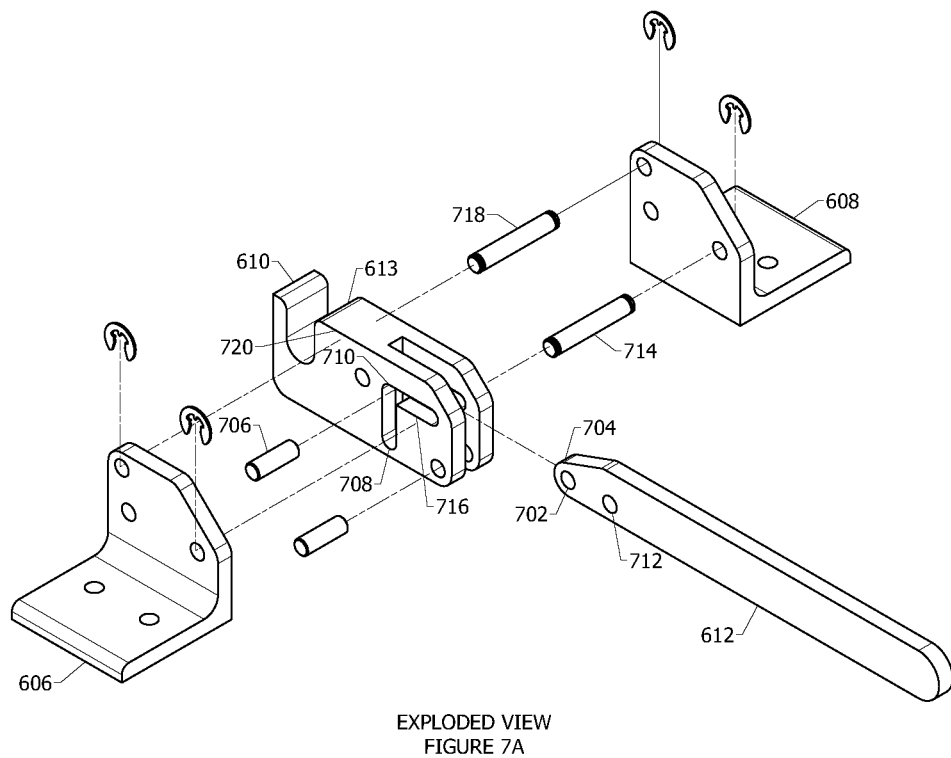
FIGS. 7A-7C are exploded and partially exploded perspective views of the locking mechanism of FIGS. 6A-6F.
Figure 7B:
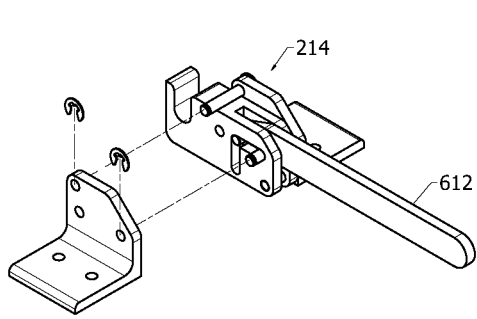
Figure 7C:
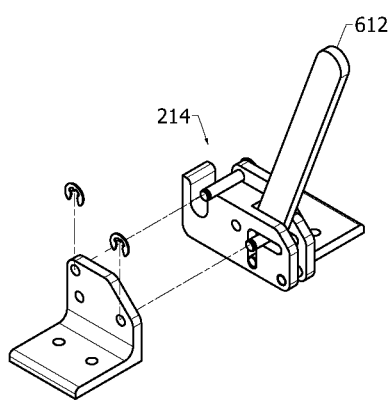
Figure 8A:
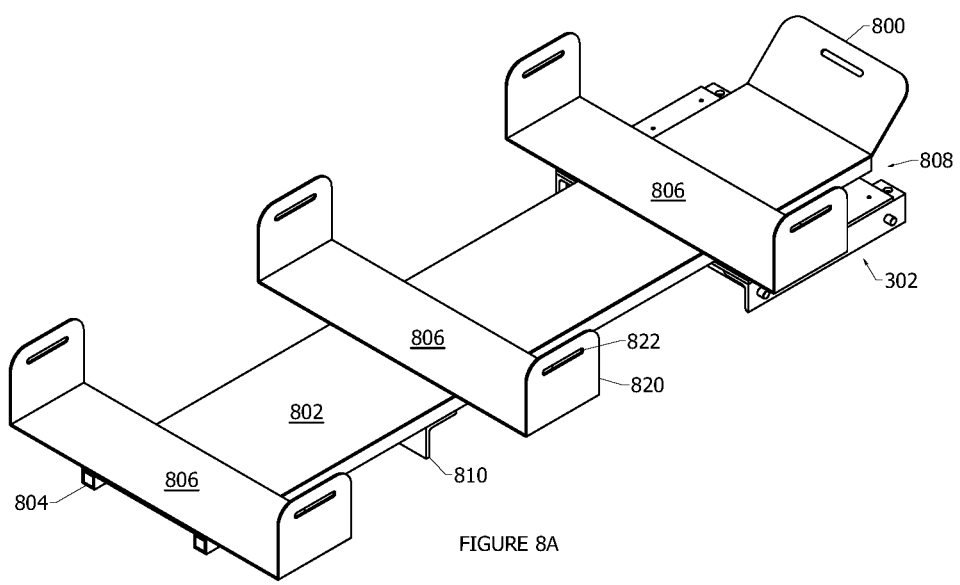
FIG. 8A-8D are perspective, top view, side view, and front views of the patient transport unit of FIG. 3F with the module portion of the quick release assembly attached to the base of the patient transport unit.
Figure 8B:
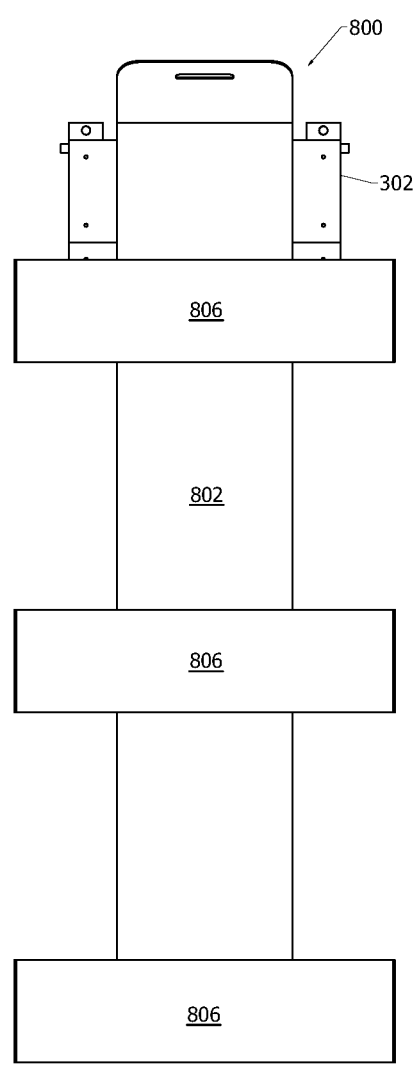
Figure 8D:
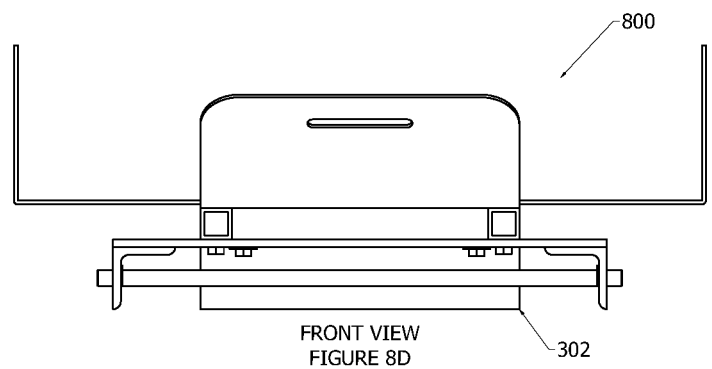
Figure 8C:
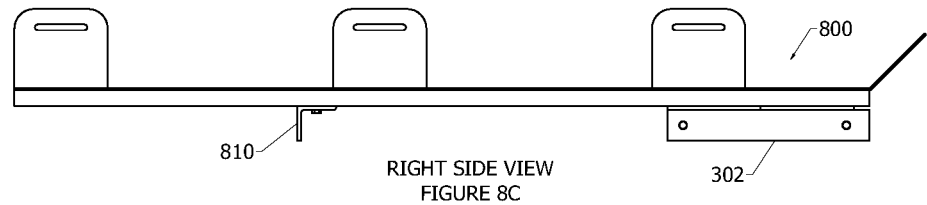

FIGS. 7A-7C further illustrate the example locking mechanism 214. FIG. 7A is an exploded view illustrating the catch 610, lever 612, brackets 606 and 608. FIGS. 7B and 7C illustrate the components of the locking mechanism with bracket 606 removed to illustrate the locking mechanism in the locked (FIG. 7B) and unlocked (FIG. 7C) positions. The illustrated locking mechanism 214 is configured to convert a pivoting motion of the lever 612 to a linear translational motion of the catch 610. In the illustrated example, the lever 612 includes a cam pin opening 702 at a first end 704 of the lever that is configured to receive a cam pin 706 for constraining movement of the first end 704 of the lever to a vertical direction along a vertical portion 708 of an angled slot 710 in the catch 610. As shown in FIGS. 7B and 7C, the cam pin 706 is located at a lower end of the vertical portion 708 of the angled slot 710 when in the locked position and slides to a top end of the vertical portion of the angled slot when in the unlocked position (FIG. 7C). The cam pin 706 has a length that is substantially equal to a spacing between the brackets 606, 608 and is configured to move relative to the brackets. The lever 612 also includes a pivot pin opening 712 adjacent the cam pin opening 702 that is configured to receive a pivot pin 714 for providing a combined rotational-translational motion of the lever 612 that includes a pivoting motion about the pivot pin as well as a translational motion of the lever and pin along a horizontal portion 716 of the angled slot 710 as the first end 704 of the lever 612 moves up and down. The pivot pin 714 is longer than the cam pin 706 and is configured to be attached to the brackets 606, 608 with, for example, a snap ring 715 and have a fixed position with respect to the brackets, thereby causing the catch 610 to slide relative to the brackets as the lever is moved up and down. The locking mechanism 214 also includes a captive pin 718 that is also attached to the brackets 606, 608 and positioned above a top surface 720 of the catch 610 for sliding engagement with the top surface of the catch and to constrain the catch to a linear motion along the top surface of the bed of the chassis (or of a plate in examples where the locking mechanism is attached to a plate rather than directly to the top surface of the chassis bed). In the illustrated example, the locking mechanism is a robust device with a strength sufficient to convert a user-provided pivoting motion of the lever 612 to a linear sliding motion of the catch 610 and transmit and multiply the user-provided force to the module portion 302 of the quick release assembly and corresponding modular component such that a relatively heavy modular component, for example, a modular component having a weight in the range of 5 pounds to 200 pounds can be slid in a horizontal direction along a cargo bed. The lever 612 provides a moment arm that multiples the hand-operated force in order to effect the movement of the modular component and move the quick release assembly between the locked and unlocked positions.

In some examples, the skid unit also includes a redundant safety device to secure the lock in the locked position so it cannot be moved into the unlock position without a specific action to undo the redundant safety device. The skid unit may also include a safety line attached from the lock component to the bed of the skid unit as a further redundant lock in case the lock assembly does not completely mate and stay in the locked position. In one example, the bed lock components are designed so that the lock arm cannot be placed in the lock position unless both components are mated properly.

FIGS. 8A-8D illustrate another example of a modular component in the form of a patient transport unit 800 that may be releasably attached to skid unit 100 using a quick release assembly of the present disclosure. In the illustrated example, the patient transport unit 800 includes the module portion 302 of the quick release assembly 211 for releasably securing the patient transport unit to the chassis 102 or other structure. In the illustrated example, the patient transport unit 800 includes a base 802 constructed from, for example, sheet metal and supported by a frame 804 of tubing, and a plurality, here three, cross members 806 configured to support a patient and in some examples, a patient handling device such as a spinal board, backboard, or stokes basket (not illustrated) for transporting an injured or deceased person. The cross members 806 each include vertical portions 820 and a slot 822 (only one of each labeled) for receiving a strap or other securing device (not illustrated) for securing a patient and spinal board, backboard, or stokes basket to the patient transport unit 800. The module portion 302 is attached to the base 802 of the patient transport unit 800 proximate a first end 808 of the patient transport unit.

The patient transport unit 800 also includes at least one support 810 that is secured to the base 802 that is designed and configured to support the patient transport unit on the cargo bed 108 of the chassis 102, the support 810 having a height that is substantially the same as a height of the quick release assembly 211 so that the base 802 of the patient transport unit is parallel to the bed of the chassis when the patient transport unit is installed in the skid unit 100. In the illustrated example, the support 810 is an angle bracket with a first member directly secured to the base 802 and a second member disposed at a right angle to the first member and designed to extend from the base 802 and come into contact with the bed of the skid unit.

Aspects of the present disclosure also include A methods of releasably locking a modular component to a cargo bed of a skid unit or vehicle, the method comprising: aligning first and second locking elements; lowering the first locking elements on to the second locking elements so that protruding ends of a pair of elongate members are slidably disposed in corresponding angled receiving channels of the second locking elements and a portion of one of the elongate members is also disposed in a catch of a locking mechanism; rotating or otherwise moving a lever or handle of a locking mechanism from a first position, for example, a raised orientation, to a second position, for example, a lowered horizontal orientation, thereby causing the catch of the locking mechanism to move in a horizontal direction, wherein the movement of the catch pushes the elongate member disposed in the catch in a horizontal direction, causing the protruding ends of the elongate members to move along horizontal portions of the angled receiving channels to a locked position.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

What is claimed is:

1. A quick release assembly for securing a modular component to a cargo bed of a vehicle or skid unit, the quick release assembly comprising:
    a first locking element configured to be disposed on the cargo bed and including a pair of brackets each configured to extend vertically from the cargo bed, wherein each of the pair of brackets defines a pair of receiving channels;
    a second locking element configured to be disposed on a base of the modular component and including a pair of elongate members configured to be received in the receiving channels when, the first and second locking elements are engaged to couple the modular component to the cargo bed; and
    a locking mechanism configured to be disposed on the cargo bed between the pair of brackets, the locking mechanism including a catch configured to receive a portion of one of the elongate members when the first and second locking elements are engaged, the catch movable between an unlocked position for receiving the second locking element and a locked position in which the first and second locking elements are locked by the locking mechanism, wherein the catch moves the elongate member along a length of the receiving channels when the catch transitions from the unlocked position to the locked position, wherein each of the receiving channels include an open end and a closed end, and wherein the catch includes a recess that is configured and dimensioned to receive the portion of one of the elongate members.

2. The quick release assembly of claim 1, wherein the locking mechanism further includes a hand-operated lever operably coupled to the catch and configured to move the catch between the unlocked position and the locked position.

3. The quick release assembly of claim 1, wherein the elongate members contact the closed end of the receiving channels when the first locking element is engaged with the second locking element and the catch is in the locked position.

4. The quick release assembly of claim 3, wherein each of the receiving channels include a vertical portion and a horizontal portion.

5. The quick release assembly of claim 4, wherein the vertical portion is above the elongate member when the first and second locking elements are engaged and the catch is in the locked position.

6. The quick release assembly of claim 5, wherein the catch moves the elongate member along a horizontal direction within the receiving channels when the catch transitions the first locking element and the second locking element from the unlocked position to the locked position.

7. The quick release assembly of claim 1, wherein movement of the catch between the locked position and the unlocked position causes the second locking element and the modular component to move relative to the cargo bed.

8. A system that includes:
    the quick release assembly of claim 1; and
    the modular component.

9. The system of claim 8, further comprising the skid unit, the modular component configured to be secured to the skid unit, wherein the skid unit is configured to be releasably installed in a cargo area of a vehicle.

10. The system of claim 8, wherein the modular component is a passenger seat, a storage box, a canine box, or a patient transport unit configured to transport a spinal board, backboard, or stokes basket.

11. A quick release mechanism for securing a modular component to a cargo bed, the mechanism comprising:
    a first element configured to be attached to the cargo bed, wherein the first element includes a pair of brackets each configured to extend vertically from the cargo bed and each defining a receiving channel;
    a second element configured to be attached to a base of the modular component, wherein the second element includes a member that is configured to extend between the pair of brackets; and
    a locking mechanism configured to be attached to the cargo bed between the pair of brackets and including a catch, wherein the catch is configured to receive the member when the first element and the second element are engaged, wherein the catch is movable between an unlocked position and a locked position, and wherein the catch moves the member along a length of the receiving channels when the catch transitions from the unlocked position to the locked position,
    wherein each of the receiving channels include an open end and a closed end and wherein the catch includes a recess that is configured and dimensioned to receive a portion of the member.

12. The quick release mechanism of claim 11, wherein, in the locked position, the member contacts the closed end of each of the receiving channels.

* * * * *